United States Patent
Sankaranarasimhan et al.

(10) Patent No.: US 9,898,260 B2
(45) Date of Patent: Feb. 20, 2018

(54) ADAPTIVE FUNCTION-BASED DYNAMIC APPLICATION EXTENSION FRAMEWORK

(71) Applicant: Samsung Electronics Co., Ltd., Suwon-si, Gyeonggi-do (KR)

(72) Inventors: Manikandan Sankaranarasimhan, Fremont, CA (US); Kalyan Desineni, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/980,204

(22) Filed: Dec. 28, 2015

(65) Prior Publication Data

US 2017/0185384 A1     Jun. 29, 2017

(51) Int. Cl.
| | |
|---|---|
| *G06F 9/44* | (2006.01) |
| *H04W 4/00* | (2009.01) |
| *H04M 1/725* | (2006.01) |
| *G06F 3/0484* | (2013.01) |
| *G06F 3/0482* | (2013.01) |

(52) U.S. Cl.
CPC ............. *G06F 8/34* (2013.01); *G06F 3/0482* (2013.01); *G06F 3/04842* (2013.01); *G06F 8/71* (2013.01); *H04M 1/72525* (2013.01); *H04W 4/003* (2013.01)

(58) Field of Classification Search
CPC ........... G06F 8/61; G06F 8/65; G06F 17/3087
See application file for complete search history.

(56) References Cited

U.S. PATENT DOCUMENTS

| | | | | |
|---|---|---|---|---|
| 8,612,933 | B1 * | 12/2013 | Gill | G06F 8/30 |
| | | | | 717/105 |
| 9,491,229 | B1 * | 11/2016 | Lachwani | H04L 67/10 |
| 2004/0054690 | A1 | 3/2004 | Hillerbrand et al. | |

(Continued)

FOREIGN PATENT DOCUMENTS

WO    WO-2013059605 A1    4/2013

OTHER PUBLICATIONS

PCT International Search Report and Written Opinion dated Oct. 4, 2016 for PCT/IB2016/052464, 17 pages.

*Primary Examiner* — Duy Khuong T Nguyen
(74) *Attorney, Agent, or Firm* — Jefferson IP Law, LLP

(57) ABSTRACT

A mobile device includes a processor and a non-transitory computer-readable medium storing instructions. The instructions include, in response to a state of a first application being instantiated from a first state template of the first application, selecting a first function module identifier from a plurality of predetermined function module identifiers. Each predetermined function module identifier corresponds to a first function offered by the first state template. The instructions include transmitting a function module request to a developer exchange system using a wireless transceiver. The function module request includes the first function module identifier, which uniquely identifies a first function module. The instructions include receiving the first function module from the developer exchange system, storing and executing the first function module, and presenting display data generated by execution of the first function module. The display data is presented in an area reserved for the first function by the first state template.

16 Claims, 13 Drawing Sheets

(56) References Cited

U.S. PATENT DOCUMENTS

| | | | |
|---|---|---|---|
| 2008/0209503 A1* | 8/2008 | Hess | G06F 21/10 726/1 |
| 2009/0254912 A1* | 10/2009 | Roundtree | G06F 8/61 718/102 |
| 2011/0314004 A1* | 12/2011 | Mehta | G06F 17/30017 707/723 |
| 2012/0233567 A1 | 9/2012 | Brown et al. | |
| 2012/0254825 A1 | 10/2012 | Sharma et al. | |
| 2012/0323898 A1* | 12/2012 | Kumar | G06F 17/30899 707/723 |
| 2013/0019239 A1* | 1/2013 | Fontignie | G06F 8/61 717/178 |
| 2013/0132896 A1* | 5/2013 | Lee | G06F 17/30997 715/808 |
| 2013/0304729 A1* | 11/2013 | Jiang | G06F 17/30905 707/723 |
| 2013/0305218 A1* | 11/2013 | Hirsch | G06F 8/36 717/106 |
| 2013/0339345 A1* | 12/2013 | Soto Matamala | G06F 17/3089 707/722 |
| 2014/0129265 A1 | 5/2014 | Arena et al. | |
| 2014/0282358 A1 | 9/2014 | Mowatt et al. | |
| 2015/0242510 A1* | 8/2015 | Shapira | G06F 17/30392 707/706 |
| 2015/0347617 A1* | 12/2015 | Weinig | G06F 21/53 715/234 |
| 2016/0321040 A1 | 11/2016 | Sankaranarasimhan et al. | |
| 2016/0321059 A1 | 11/2016 | Sankaranarasimhan et al. | |
| 2016/0321060 A1 | 11/2016 | Sankaranarasimhan et al. | |
| 2016/0321064 A1 | 11/2016 | Sankaranarasimhan et al. | |
| 2017/0187838 A1 | 6/2017 | Sankaranarasimhan et al. | |

* cited by examiner

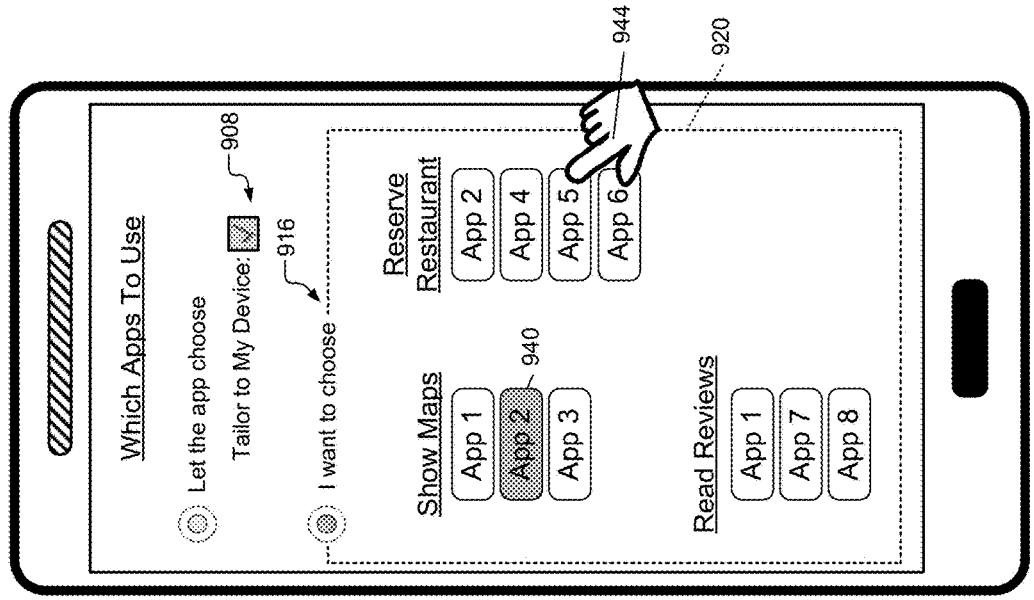
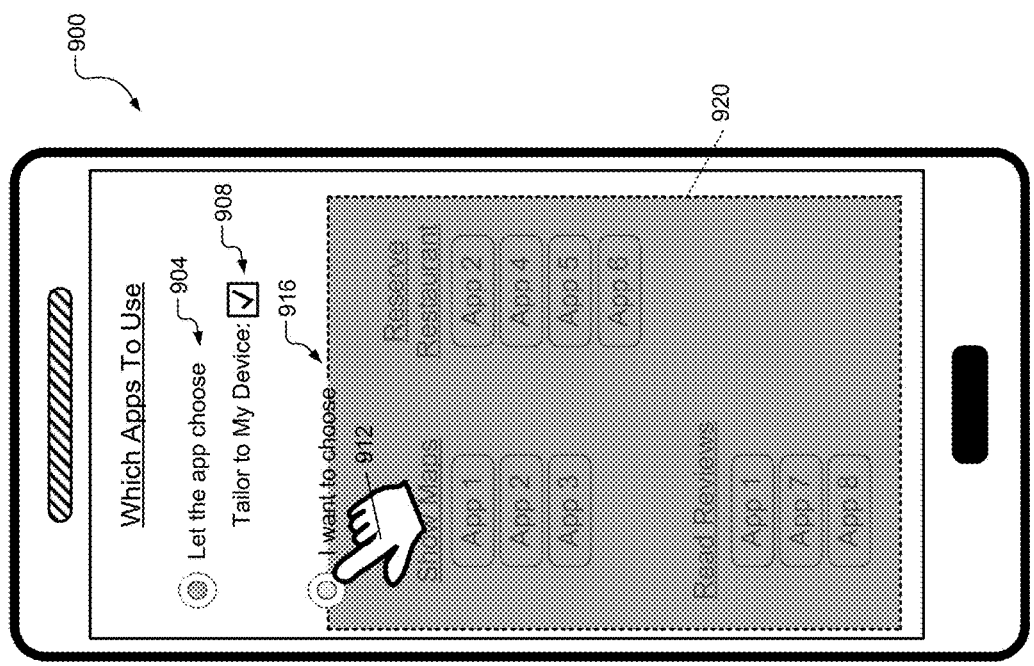
FIG. 10B
FIG. 10A

ADAPTIVE FUNCTION-BASED DYNAMIC APPLICATION EXTENSION FRAMEWORK

FIELD

The present disclosure relates to application development and more particularly to systems and methods for collaborative application development for mobile devices.

BACKGROUND

In recent years, the use of Internet-connected devices such as smartphones has grown exponentially. The number and variety of available software applications for such devices has similarly grown by orders of magnitude. Presently, many diverse functions can be performed and many diverse sets of data can be analyzed on any given Internet-connected device. The applications that offer this functionality and data span business-oriented applications, educational applications, games, new applications, shopping applications, messaging applications, media streaming applications, social media applications, etc.

With such a wide array of available applications, many users of Internet-connected devices are not aware of the availability of applications that may perform functions and/ or provide data of interest to the users. Even app developers, who generally focus on one segment of the market for applications, are unable to keep up to date on all of the applications that their users might find valuable in other segments. Further, no developer can expertly implement even a fraction of the spectrum of functionality available across the application ecosystem.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A mobile device includes a processor and a wireless transceiver configured to communicate with a developer exchange system over a wireless communications medium. The mobile device includes a non-transitory computer-readable medium storing instructions for execution on the processor. The instructions include, in response to a state of a first application being instantiated from a first state template of the first application, selecting a first function module identifier from a plurality of predetermined function module identifiers. Each of the plurality of predetermined function module identifiers corresponds to a first function offered by the first state template. The plurality of predetermined function module identifiers and an associated rank ordering are predetermined by a developer of the first application. In a first operating mode the selecting is based on a highest-ranked function module identifier in the rank ordering. The instructions include transmitting a function module request to a developer exchange system using the wireless transceiver. The function module request includes the first function module identifier, which uniquely identifies a first function module. The instructions include receiving, via the wireless transceiver, the first function module from the developer exchange system. The instructions include storing the first function module. The instructions include executing the first function module. The instructions include presenting display data generated by execution of the first function module. The display data is presented in an area reserved for the first function by the first state template.

In other features, the mobile device includes selectively presenting a user interface to a user of the mobile device. The user interface allows the user to activate a second operating mode. The user interface allows the user to identify one of the plurality of predetermined function module identifiers. In the second operating mode, the selecting sets the user-identified function module identifier as the first function module identifier. In other features, the presenting the user interface is disabled based on a setting specified by the developer.

In other features, the plurality of predetermined function module identifiers and the rank ordering are one of (i) retrieved from the developer exchange system via the wireless transceiver and (ii) stored into the first application during development of the first application. In other features, the selecting includes generating a consideration set of function module identifiers from the plurality of predetermined function module identifiers based on metadata associated with the plurality of predetermined function module identifiers. The selecting includes selecting the first function module identifier from the consideration set.

In other features, the metadata indicates, for each function module identifier of the plurality of function module identifiers, a related app. The instructions include assembling a list of applications installed on the mobile device. The generating includes omitting function module identifiers whose related app is not among the list of installed applications. The instructions include, in response to all of the related apps for the plurality of function module identifiers being missing from the list of installed applications, the omitting is not performed.

In other features, the metadata indicates, for each function module identifier of the plurality of function module identifiers, a required operating system version. The generating includes omitting function module identifiers whose required operating system version is higher than an operating system version of the mobile device. In other features, the instructions include storing the first function module in a function module data store. The function module data store includes nonvolatile memory. In other features, performance of the transmitting and receiving is skipped in response to a time elapsed, since a prior function module request with the first function module identifier was transmitted, being less than a predetermined period of time.

In other features, the instructions include receiving a version number from the developer exchange system in response to the function module request and, in response to the received version number matching a version number of a copy of the first function module stored in the function module data store, omitting receiving the first function module. In other features, the first function is selected from a function ontology maintained by the developer exchange system. In other features, the first function module is executed in a sandbox.

A computer-implemented method of operating a mobile device includes communicating with a developer exchange system over a wireless communications medium using a wireless transceiver. The method includes, in response to a state of a first application being instantiated from a first state template of the first application, selecting a first function module identifier from a plurality of predetermined function module identifiers. Each of the plurality of predetermined function module identifiers corresponds to a first function offered by the first state template. The plurality of predetermined function module identifiers and an associated rank ordering are predetermined by a developer of the first application. In a first operating mode the selecting is based on a highest-ranked function module identifier in the rank ordering. The method includes transmitting a function module request to a developer exchange system using the wireless transceiver. The function module request includes the first function module identifier, which uniquely identifies a first function module. The method includes receiving, via the wireless transceiver, the first function module from the developer exchange system. The method includes storing the first function module. The method includes executing the first function module. The method includes presenting display data generated by execution of the first function module. The display data is presented in an area reserved for the first function by the first state template.

In other features, the method includes selectively presenting a user interface to a user of the mobile device. The user interface allows the user to activate a second operating mode. The user interface allows the user to identify one of the plurality of predetermined function module identifiers. In the second operating mode, the selecting sets the user-identified function module identifier as the first function module identifier. In other features, the presenting the user interface is disabled based on a setting specified by the developer.

In other features, the plurality of predetermined function module identifiers and the rank ordering are one of (i) retrieved from the developer exchange system via the wireless transceiver and (ii) stored into the first application during development of the first application. In other features, the selecting includes generating a consideration set of function module identifiers from the plurality of predetermined function module identifiers based on metadata associated with the plurality of predetermined function module identifiers. The selecting includes selecting the first function module identifier from the consideration set.

In other features, the metadata indicates, for each function module identifier of the plurality of function module identifiers, a related app. The method includes assembling a list of applications installed on the mobile device. The generating includes omitting function module identifiers whose related app is not among the list of installed applications. In response to all of the related apps for the plurality of function module identifiers being missing from the list of installed applications, the omitting is not performed. In other features, the metadata indicates, for each function module identifier of the plurality of function module identifiers, a required operating system version. The generating includes omitting function module identifiers whose required operating system version is higher than an operating system version of the mobile device.

In other features, the method includes storing the first function module in a function module data store. The function module data store includes nonvolatile memory. The method includes skipping performance of the transmitting and receiving in response to a time elapsed, since a prior function module request with the first function module identifier was transmitted, being less than a predetermined period of time. The method includes receiving a version number from the developer exchange system in response to the function module request. The method includes, in response to the received version number matching a version number of a copy of the first function module stored in the function module data store, omitting receiving the first function module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 10A and FIG. 10B are example user interfaces for allowing a user to specify function module selection criteria.

In the drawings, reference numbers may be reused to identify similar and/or identical elements.

DETAILED DESCRIPTION

Figure 1:
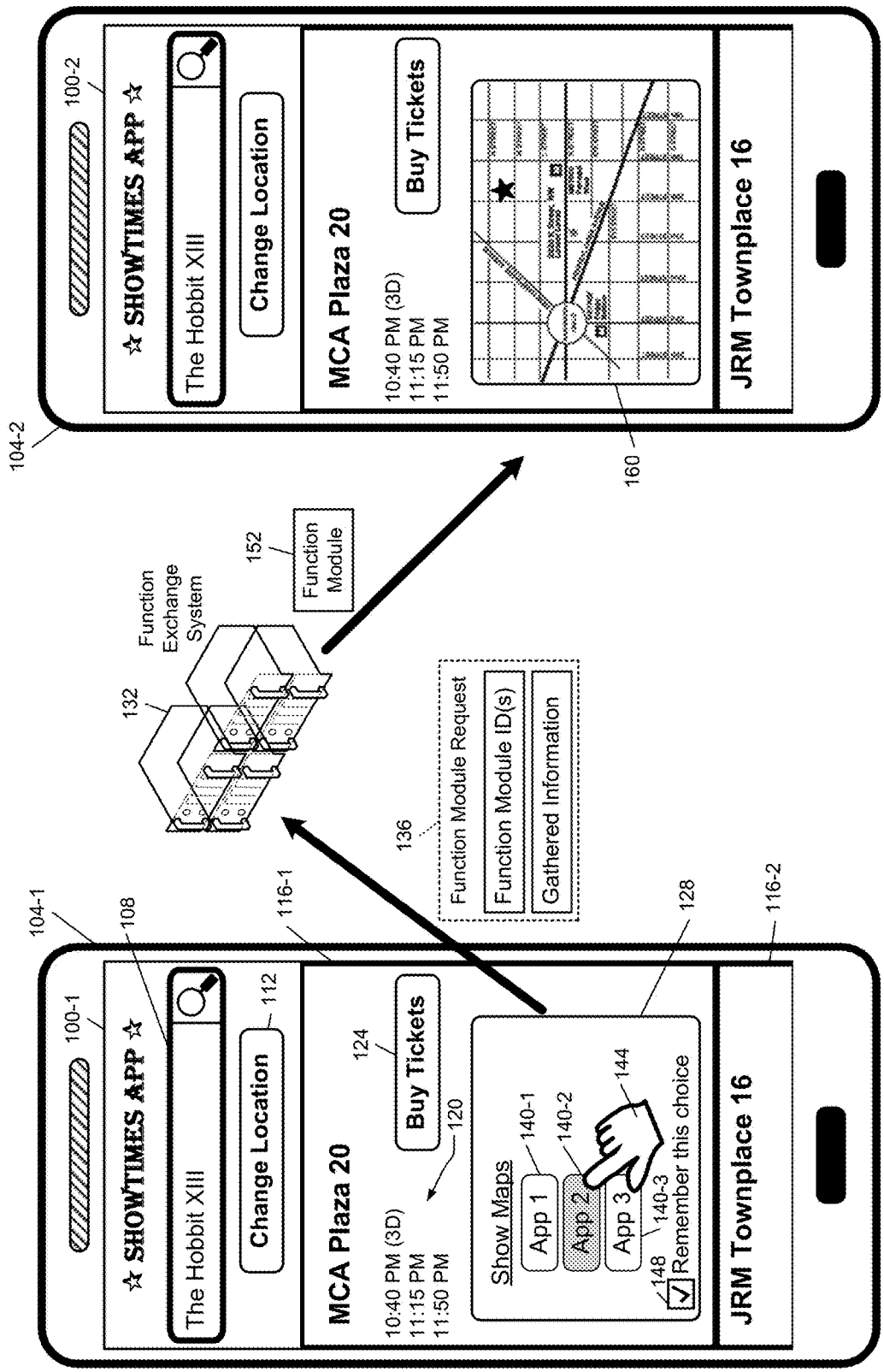
FIG. 1 is a combined functional block diagram and graphical user interface example according to the principles of the present disclosure.

A developer of an application (referred to interchangeably here as an app) generally focuses on providing a good user experience for a limited number of functions. For example, an app developer may focus on presenting accurate and intuitively-presented movie showtimes, but may not invest effort in providing other related functionality, such as providing maps or navigation directions to movie theaters. Note that the functions provided by an app may also be described as actions that the app can perform.

An app developer would generally prefer to keep a user within the developer's own app, both to increase engagement with the app and to provide the most seamless user experience. However, attempting to replicate a function from another app may not provide a better user experience when that other function is not the developer's core strength. For example, if the developer is skilled at presenting movie showtimes and possesses valuable data and processing algorithms related to showtimes, the developer likely is not an expert in GPS-based mapping software. As a result, that developer should rely on others to provide mapping functions.

In order to access the functionality of another app, a developer may hardcode a reference to that other app when writing their code. In some circumstances, it is quite likely that a certain app would be available on an operating system. For example, a developer may reasonably expect that GOOGLE MAPS mapping software will be available on a smartphone running the ANDROID operating system, although there are notable exceptions to this general rule, especially outside of the United States.

However, even when an app is installed, a user or developer may prefer to use a different app. For most other categories of apps, such as movie review apps or restaurant review apps, there is no guarantee that any particular app will be present. Therefore, hardcoding access to one or more specific apps is an exercise in guesswork. Also, the constant evolution of the app ecosystem means that the most popular, the most widely installed, and the most useful apps in any category may be different and may change with time.

For certain functions, a request may be passed to the operating system. For example, to map a location, a mapping request can be passed to the operating system. The operating system may present the user with a list of installed apps to service that mapping request. The operating system may allow the user to choose one of the apps as a default and, once the default is selected, the average user may never revisit that choice. Certain operating systems may not present a choice for certain requests, instead passing the request to a default app or service unless an explicit configuration change is made by the user.

The ability of an app developer to integrate with other apps that would provide valuable functionality to users is technologically limited and difficult to implement. There is also no systematic way for developers to enter business relationships with each other. The present disclosure describes a function exchange system in which a developer can act as a producing developer and provide function code related to a particular function to the function exchange system, and a developer acting as a consuming developer can integrate that function code into their own application.

This integration may be performed during development, such as when a movie showtimes app developer (acting as a consuming developer) integrates function code for mapping from a producing developer. In other implementations, the showtimes app may request the mapping function code from the function exchange system dynamically, such as when the app is first executed on the user device or at periodic intervals. In various implementations, the function code is requested from the function exchange system when a screen (also known as a state) of the showtimes app which the mapping functionality will be relevant is displayed to a user.

If the function code from the producing developer is updated, the consuming developer app may update stored copies of the function code. This update may be performed in a pull configuration, where the consuming app periodically checks with the function exchange system to see if updates are available. In other implementations, the function exchange system may push updates out to apps. In another example, a consuming app may opt to subscribe to updates from the function exchange system when the consuming app first downloads the function code.

The function code provided by the producing developer, which will be referred to below as a function module, may take a variety of forms. The function module may include software code of varying levels of complexity or may simply include static data. For example, a function module for a specific location may include an image of a map encompassing that location. Selection by the user of the image may link the user to another app that will provide interactive mapping for the user. The image may be supplemented and/or replaced by text information, such as the name of the app, information about the popularity of the app, etc.

The resulting preview may be described as a deep view card, and is associated with a deep link to another app that can provide further interaction, such as by providing an interactive map display, navigation directions, etc. A deep link means that the user is taken directly to the desired location within the mapping application, as opposed to being taken to a default state of the mapping application.

A deep view card (DVC) for an app or a state of an app shows additional information, not just the identification of the app or app state. For example, the information may include a title of the app state or a description of the app state, which may be a snippet of text from the app state. Other metadata may be provided from the app state, including images, location, number of reviews, average review, and status indicators. For example, a status indicator of "open now" or "closed" may be applied to a business depending on whether the current time is within the operating hours of the business.

Some DVCs may emphasize information that led to the DVC being selected as a search result. For example, text within the DVC that matches a user's query may be shown in bold or italics. The DVC may also incorporate elements that allow direct actions, such as the ability to immediately call an establishment or to transition directly to a mapping app to get navigation directions to the establishment. Other interactions with the DVC (such as tapping or clicking any other area of the DVC) may take the user to the indicated state or app. As described in more detail below, this may be accomplished by opening the relevant app or, if the app is not installed, opening a website related to the desired app state. In other implementations, an app that is not installed may be downloaded, installed, and then executed in order to reach the desired app state.

In other words, a DVC includes identifying information for the app or state as well as additional content from the app or state itself. The additional content allows the user to make a more informed choice about which result to choose, and may even allow the user to directly perform an action without having to navigate to the app state. If the action the user wants to take is to obtain information, in some circumstances the DVC itself may provide the necessary information to accomplish such action.

The function module may include multiple images for use in deep view cards of different sizes. The consuming developer may reserve a certain section of a state for the deep view card, and the different sizes allow the image to be tailored specifically to the desired size. The function module may include code for creating the deep view cards, which may include selecting an image of an appropriate size and/or scaling images.

The function module may also include deep view creation code that creates the preview image. For example, the deep view creation code may query an app on the device or a server to generate an image showing the location of interest. The deep view creation code may also generate the deep link that will be followed upon selection of the deep view card by the user. The deep view creation code may receive information, such as a location, from the code written by the consuming developer.

Continuing the mapping example, the deep view creation code requests mapping data and/or an image of mapping data from a source related to the producing developer. This source may be an app of the producing developer that is installed on the user device or may be a server system operated by the producing developer.

For example, the consuming developer may integrate an entity-generic function module from a mapping vendor. When a state for a movie theater is shown to the user, the consuming app passes the movie theater location to the function module. The function module queries a mapping server of the producing developer and creates a deep view card. The deep view card includes, as one example, a preview image of the movie theater location within a map, and a deep link to the movie theater's location within the producing developer's app.

A deep link may include a programming call that opens the producing developer's app to a specific state. The deep link may include a uniform resource locator (URL) to a web edition of the producing developer's app. The deep link may include a script that opens the producing developer's app to a default state and then navigates to the desired state. The URL may be used in situations where the producing developer's app is not installed on the user device.

In some implementations, some or all of the function modules may include code that not only presents a deep view card but also provides additional functionality when the deep view card is selected. For example, a producing developer of a mapping application may generate a function module that includes all the code necessary to provide an interactive map. This function module can then, without linking out to other apps, provide an interactive map within the consuming developer's app. The function module therefore may include code for creating a deep view card, for identifying location based on GPS and Wi-Fi signals, and code for retrieving map data from a mapping server.

The function module may also include code for implementing a user interface that allows the user to interact with the map. The user interface created by the function module may be a separate state that is opened when the user selects the deep view card of the map. In some implementations, the function module may allow the image of the map in the deep view card itself to be manipulated without transitioning to another state.

When the consuming developer is developing an app (referred to as a first app), the consuming developer may obtain a specific function module from the function exchange system from a specific producing developer. For example, the consuming developer may select a mapping function module from NOKIA Corp. using the function exchange system.

The consuming developer may identify a specific function from an ontology (see FIG. 2 for an example) established by the function exchange system. The consuming developer can then select one or more function modules that offer the specified function.

Some function modules may correspond to traditional apps available through traditional digital distribution platforms. While function modules are not necessarily exact subsets of available apps, many producing developers will produce function modules by segmenting functionality of their existing and upcoming apps. As a result, the user experience for a function module from a certain developer may be similar to that subset of functionality in the publicly available app from that developer.

When the consuming developer selects multiple function modules for a given function, a selection process needs to be used when invoking a function module in the consuming developer's app. The consuming developer may assign a ranking to the selected function modules, indicating that the highest-ranked function module should be used.

In some circumstances, such as based on the dependencies and requirements of the highest-ranked function module, the second-ranked function module will need to be used instead. For example, the highest-ranked function module may require a higher version number of the operating system on the user device.

The developer may also specify that the ranking can be overruled based on other characteristics of the user device. For example, if one of the selected function modules corresponds to an app already installed on the user device, that function module may be used to present a consistent interface to the user of the user device. In other circumstances, which may depend on sponsorship and advertising, the consuming developer's app may choose to select a function module corresponding to an app not yet installed on the user device. This creates exposure for the uninstalled app.

Additional information from the user device, such as which accounts are active on the user device, may assist in choosing a function module. For example, if multiple function modules are selected for a video streaming function, the consuming developer's app may choose whichever video streaming function module has a corresponding active user account on the user device. Further, usage information may help to narrow down multiple function modules. For example, when two function modules correspond to two apps installed on the user device, usage information may indicate which app the user is more familiar with.

The consuming developer may offer the user the ability to explicitly influence the choice of function module. For example, the first time that a given function is encountered in the consuming developer's app, and potentially at regular intervals afterward, the user may be presented with a choice of which function module to use to provide that function. In other implementations, the developer may choose their own highest-ranked function module to be used by default, while allowing the user to make a configuration change to select a different function module.

Further, aggregate data may be used to select function modules. The function exchange system may track, in an anonymous manner, how many users select each function module. This indicates popularity of function modules and may be used to re-rank or supplement developer ranking of function modules.

Once one of the specified function modules is selected, the consuming developer's app requests that function module from the function exchange system. In various other implementations, the selection process may be performed at the function exchange system based on data about the user device and data regarding the developer ranking.

For example, the app may provide the developer ranking, information about installed apps, and information about the version of the operating system to the function exchange system. The function exchange system then identifies a function module based on the criteria discussed above and informs the user device of which function module was chosen. If the user device has not already cached the latest version of the specified function module, the user device downloads the function module from the function exchange system.

The first app executes the function module, such as within a sandbox implemented by code from the function exchange system. The sandbox may significantly limit the function module's interaction with the user device, such as by constraining access to hardware resources of the user device, other applications, and any memory outside of a predefined range.

The function exchange system may provide the consuming developer with code required for dynamically retrieving, updating, and executing function modules. This code is integrated into the first app during development. The code provided by the function exchange system may be offered as a library or package, and may be included as part of a software development kit (SDK). Identification by the consuming developer of what function modules are desired may be performed using the SDK or may be specified using a web portal of the function exchange system.

Graphical User Interface

In FIG. 1, an unsophisticated showtimes app 100 is shown running on a user device 104, such as a smartphone. A first view of the showtimes app 100 is shown at 100-1 within a first representation of the user device 104 at 104-1. Similarly, a second view of the showtimes app 100 is shown at 100-2 within a second representation of the user device 104 at 104-2. The showtimes app 100 may be developed by a developer specializing in scraping movie showtimes from individual theater websites. However, the developer may have no experience or special abilities in providing maps to the theaters. Therefore, the developer may use the function exchange system to integrate mapping functionality into the showtimes app 100.

A search bar 108 allows the user to search for a specific movie (in this case, a fictional "The Hobbit XIII"). The showtimes app 100 may show theaters around the present location of the user device 104 or may allow the user to specify location using a "change location" button 112.

Results are shown, including an MCA Plaza 20 movie theater result 116-1 and a JRM Townplace 16 movie theater result 116-2. The result 116-1 includes movie times 120, a "buy tickets" button 124, and a placeholder 128 for the location of the theater.

The showtimes app 100 includes a dynamic execution framework from a function exchange system 132 that operates in response to a state (or, screen) of the showtimes app 100 being activated. The dynamic execution framework sends a function module request 136 to the function exchange system 132. The function module request 136 specifies one or more function module ideas.

When the selection of a function module is performed on the user device 104, the function module request 136 may include a single function module ID corresponding to the selected function module. However, when the user device 104 has narrowed it down to multiple function modules or has performed no selection process, all of the relevant function module IDs may be included in the function module request 136. In these situations, the function exchange system 132 selects a function module based on, for example, a popularity of the function module.

In other implementations, the function exchange system 132 includes settings made by the developer of the showtimes app 100 indicating how function module selection should be performed. The function exchange system 132 may look up these developer-specified rules and apply them when selecting a function module. The function module request 136 may also include gathered information 144, such as which mapping applications are installed on the user device 104.

In one example implementation, a first time that a new function is encountered while the user uses the showtimes app 100, the user is offered a selection of which function module to use. For example, as shown in FIG. 1, three choices of function module 140-1, 140-2, and 140-3 are offered.

Each of the function module options (collectively, function module options 140) may be shown with data indicating, for example, apps from the same producing developer that correspond to the offered functions. For example, developer information may be presented in addition to, or alternatively to, identifying the mobile app from which that functionality is sourced. A miniature cartoon hand 144 is shown selecting the function module 140-2.

At the time of selection, a visual indicator may provide feedback to the user that the selection was successfully performed. This visual feedback is shown in FIG. 1 as a gray fill in the user interface element corresponding to the function module 140-2. Another user interface element, such as checkbox 148, allows the user to specify a default for this function. When the checkbox 148 is checked, the user may not be asked again and the function module 140-2 will be used from then on.

In some implementations, the user is allowed to manually change this setting after first selection. In other implementations, after a long delay in which the function has not been accessed by the user, the choice shown in FIG. 1 may be presented once again to the user. For example, the period of time may be one month. When presenting the user with an option for which a choice has previously been made, the previously made choice may be highlighted or visually emphasized in some other way so that the user can easily reselect the same option.

The function exchange system 132 responds with a function module 152. The function module 152 allows the showtimes app 100 to populate the placeholder 128 with map 160, in which the theater's location is indicated with a star. As described above, the function module 152 may include the image that is shown in the map 160 or may include code that allows the image to be retrieved and/or generated. The same function module may be used to render map for the result 116-2.

Figure 2:
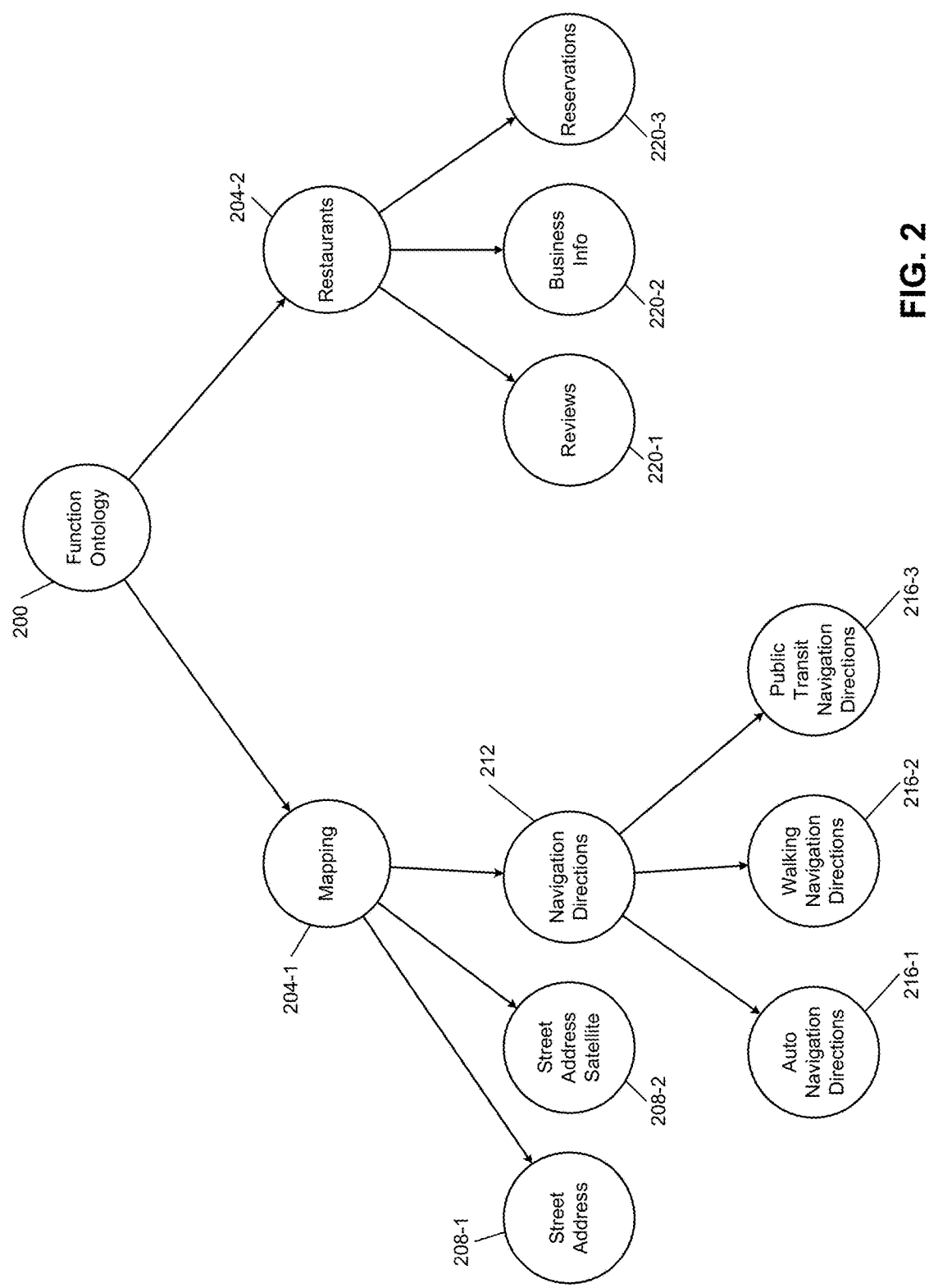
FIG. 2 is a graphical representation of an example function ontology.

In FIG. 2, a function ontology 200 developed by an operator of the function exchange system 132 includes a number of branch nodes (such as mapping branch node 204-1 and restaurants branch node 204-2), which may represent different industry verticals. The function ontology 200 includes street address mapping leaf node 208-1 and street address with satellite imagery leaf node 208-2 underneath the branch node 204-1.

Each of the leaf nodes corresponds to a particular function offered by one or more apps. A navigation directions branch node 212 underneath the branch node 204-1 encompasses auto navigation directions leaf node 216-1, walking navigation directions leaf node 216-2, and public transit navigation directions leaf node 216-3. The function ontology 200 also includes reviews leaf node 220-1, business information leaf node 220-2, and reservations leaf node 220-3 underneath the branch node 204-2.

The function ontology 200 may be arranged in a wide variety of ways and may be divided at varying levels of granularity. For example, the leaf nodes 208-1 and 208-2 may be combined under a common street address branch node, where leaf node 208-1 would simply specify no satellite imagery while leaf node 208-2 would specify the presence of satellite imagery.

Decisions on how to structure the function ontology 200 may be made by operators of the function exchange system 132 based on, for example, how many apps perform each function. If a leaf node exists that specifies a function only performed by one app, that leaf node may be combined with other leaf nodes so that a selection of applications is available.

When a consuming developer is searching for function modules that offer a function of interest for their app, the function may be specified as a leaf node corresponding to a specific function or as a branch node corresponding to a variety of functions. For example, the consuming developer may specify mapping (the branch node 204-1) as the desired function if the specific mapping function provided by the function module is not important. However, if the consuming developer requires that public transit be encompassed by the function module, the consuming developer would specify the leaf node 216-3 for public transit navigation directions.

Figure 3:
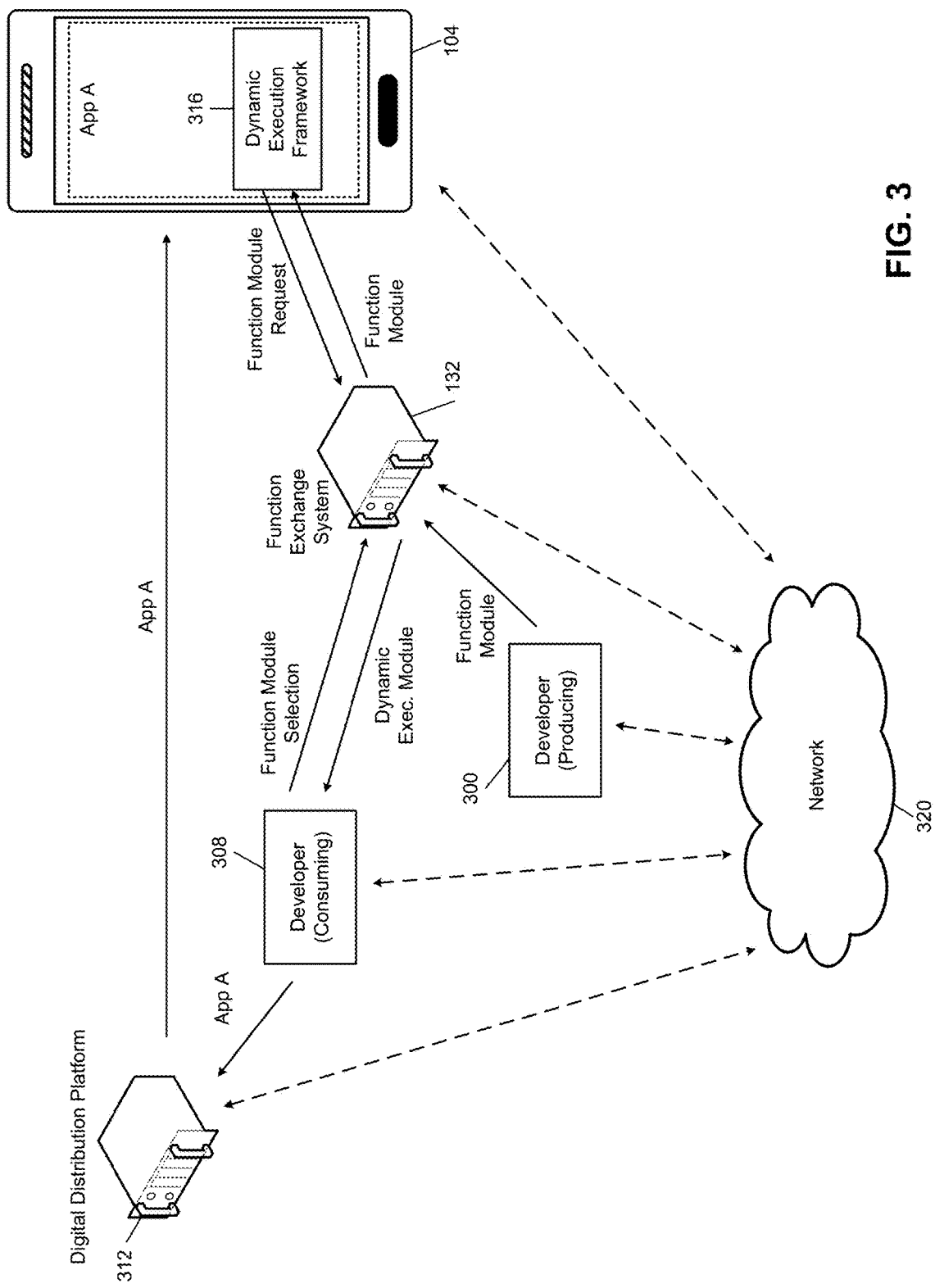
FIG. 3 is a high-level functional block diagram demonstrating how the principles of the present disclosure can be used in a mobile application ecosystem.

In FIG. 3, a high-level overview of an overall app ecosystem is shown. A producing developer 300 provides one or more function modules to a function exchange system 132. A consuming developer 308 interacts with a function exchange system 132 to specify selected function modules. An app developer may operate both in a producing role as the producing developer 300 as well as in a consuming role as the consuming developer 308.

The function exchange system 132 may provide one or more function modules to the consuming developer 308. In other implementations, the function exchange system 132 may provide a dynamic execution framework to the consuming developer 308. The dynamic execution framework will allow an app developed by the consuming developer 308 to retrieve function modules from the function exchange system 132.

The consuming developer 308 incorporates the dynamic execution framework or specific function modules into an application under development (referred to in FIG. 3 as "App A"). App A is provided to a digital distribution platform 312, such as the PLAY digital distribution platform by Google Inc. or the APP STORE digital distribution platform by Apple Inc.

A user of a user device 104 downloads App A from the digital distribution platform 312. Upon executing App A on the user device, or upon a specific state of App A being accessed, a dynamic execution framework 316 within App A makes a function request to the function exchange system 132, and receives a function module from the function exchange system 132.

As described above, the dynamic execution framework 316 is presented to the user device 104. In other implementations, the dynamic execution framework 316 may make the function request each time the app is started up. In this way, download of updated function modules may be performed in the background so there is no wait when the corresponding state is displayed to the user.

Although FIG. 3 shows the effective flow of data between the components, in most situations, the producing developer 300, the consuming developer 308, the digital distribution platform 312, the function exchange system 132, and the user device 104 communicate via a network 320. The network 320 may not be a single network but may encompass local area networks, the proprietary networks of mobile phone providers, and a distributed communications network, such as the Internet.

The user device 104 may include a processor, memory, and a wireless transceiver configured to transmit packets to and receive packets from the network 320. For example, the wireless transceiver may include a LTE (long term evolution) wireless radio transceiver or a LAN (local area network) wireless radio transceiver, which may conform to IEEE 802.11-2012. Messages, requests, responses, and applets may be transmitted and received over the network 320 using the transceiver.

Developer Portal

Figure 4:
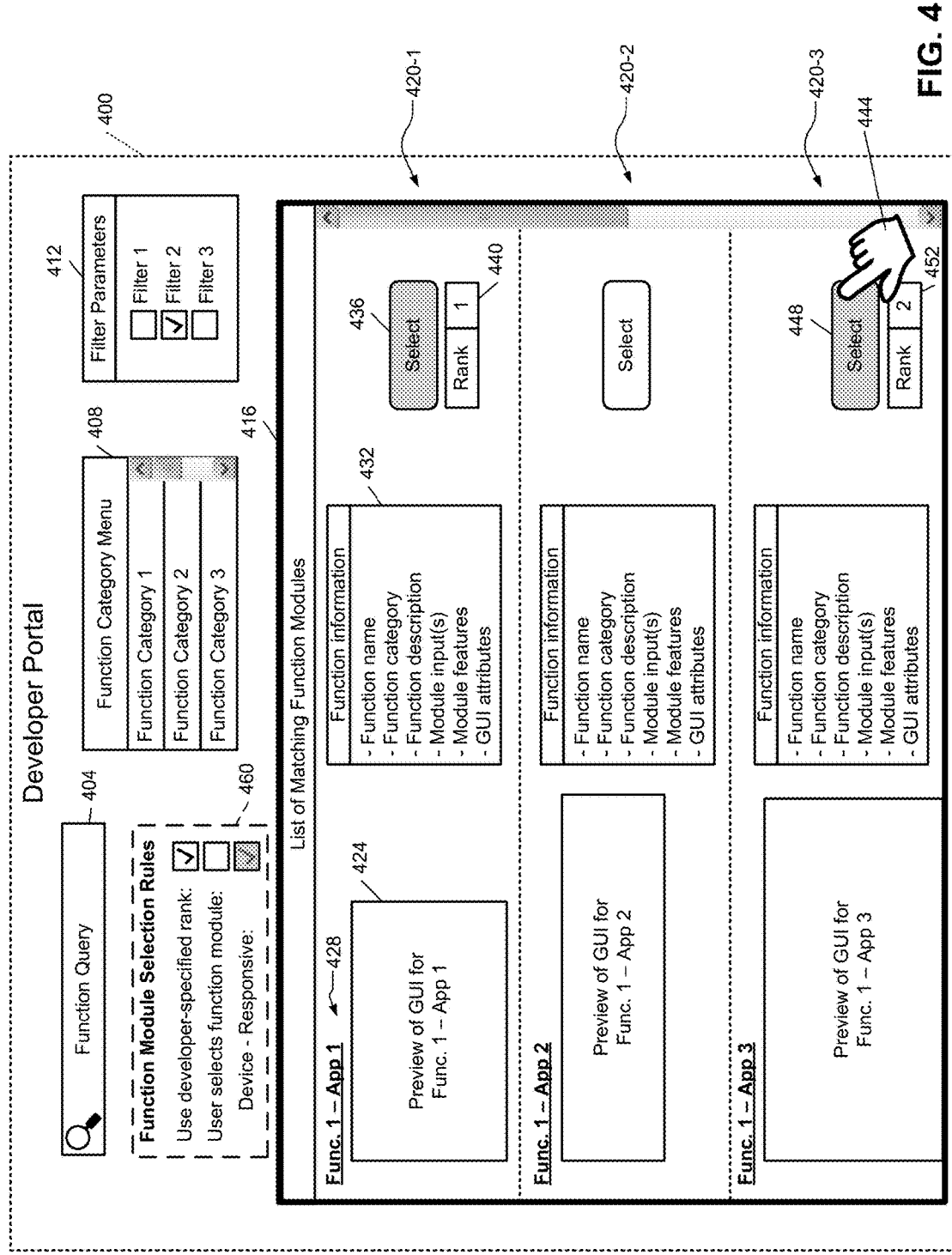
FIG. 4 is a simplified graphic user interface of an example developer portal.

In FIG. 4, a developer portal 400 for the function exchange system 132 is shown. A consuming app developer (referred to as App Developer A) is logged into the developer portal 400. App Developer A may specify settings and choose function modules for an app, referred to as App A.

In some implementations, App Developer A may review available functions and choose function modules of interest without the developer portal 400 receiving any information about which app a function will be used for. Alternatively, the developer portal 400 can assist App Developer A in tracking which functions have been used for App A specifically.

A function query text box 404 allows the developer to search for a function, function module, developer, or other metadata. A function category menu 408 may allow the developer to choose one or more specific categories within which to search. In various implementations, the categories may correspond to higher level branch nodes in the function ontology 200, such as the branch node 204-1 for mapping or the branch node 204-2 for restaurants.

Filter parameters 412 allow the developer to hide function modules that do not meet specified filter criteria. For example only, a checkbox is enabled next to "filter 2," indicating that any function modules not satisfying the criteria of filter 2 will be omitted from a list 416 of matching function modules.

For example, one filter criterion may be that the function module must be interactive instead of static. Another filter criterion may be that the function module has been updated within the last six months. Another filter criterion may be that the function module has been approved for use with a latest version of a device operating system, such as the ANDROID operating system from Google Inc. Another filter criterion may be that the function module includes an access mechanism for invoking another app in order to perform further functionality.

In the list 416, matching function modules 420-1, 420-2, and 420-3 are displayed, with a scroll bar indicating that additional function modules also meet the criteria specified above. For the function module 420-1, a preview 424 of the graphical user interface is displayed and a title 428 indicates the function performed and an indicator of the source of the function module, such as the developer's name, the name of the app from which the function module was derived, etc.

Additional function information may be listed at 432, and includes a full function name, a function category, a text description of the function, inputs that can be provided to the function module, as well as inputs that are required for the function module, features of the module, and graphical user interface attributes. User interface attributes may include minimum and maximum graphical areas within which the function module can operate, which may be specified in terms of number of horizontal and vertical pixels.

A selection button 436 allows the developer to toggle on and off selection of the function module 420-1 to satisfy the current function of interest. When the developer's app requires multiple functions of interest, the developer portal 400 may present a similar interface as shown in FIG. 4 for each function of interest. Similarly, when the developer is creating multiple apps, an interface such as that shown in FIG. 4 may be presented for each function of interest for each app under development. For more information, see commonly-assigned U.S. patent application Ser. No. 14/834, 312, filed Aug. 24, 2015, titled "Developer Exchange System," with first-named inventor Manikandan Sankaranarasimhan, the entire disclosure of which is incorporated by reference.

The selection button 436 is visually highlighted to indicate that the function module 420-1 has been selected. As a result of selection, a rank identifier 440 is displayed. The rank identifier 440 indicates the developer's specified rank for the selected function module. For example, the ranks may initially be assigned in order of selection by the developer. The developer can then modify the ranks, such as by typing in a new number into the rank identifier 440. In other implementations, the set of selected function modules may be presented in a list interface, and the ranking can be established by clicking and dragging function modules around within the list.

The resulting rank order lists the function modules 420 from highest priority (most likely to be selected, which may correspond to the number 1) down to the lowest priority (least likely to be selected). The ranking may not use consecutive numbers, but in various implementations is monotonic. In other words, the numeric ranks may skip numbers, such as when a function module is removed from the selection list, and the remaining function modules are not renumbered. A hand 444 illustrates selecting of the selection button 448, adding the function module 420-3 to the list of selected function modules and making visible a rank identifier 452.

Once all the functions of interest are determined, App Developer A may initiate a download. A customized library may be provided to App Developer A for integration into App A. In various other implementations, a set of API calls corresponding to the selected function modules is provided to App Developer A for use with a generic software development kit (SDK) library provided for App Developer A.

The SDK may be downloaded at the same time as an app is being configured or may be downloaded when App Developer A first begins using the developer portal 400. The SDK may integrate with a programming environment of App Developer A, such as an integrated development environment.

The SDK may allow App Developer A to insert one of the function modules with a minimum of effort. For example, App Developer A may specify an area of a state where a function module should be provided and the SDK provides the dynamic execution framework that will select, download, and execute a function module to provide that function within the specified area.

The settings chosen by App Developer A, either globally, per app, or per function, may be captured within App A, such as specific API calls to a library provided by the developer portal 400. Similarly, all of these settings may also be transmitted to the function exchange system 304. When the function exchange system 132 recognizes the app, the developer, or the requested function, the function exchange system 132 may consult the established settings.

The settings chosen by App Developer A, either globally, per app, or per function, may be captured within App A, such as specific API calls to a library provided by the developer portal 400. Similarly, all of these settings may also be transmitted to the function exchange system 132. When the function exchange system 132 recognizes the app, the developer, or the requested function, the function exchange system 132 may consult the established settings.

When the user is permitted to select the function module, the user may also be permitted to determine whether the function module selection will be device-responsive. In this context, device-responsive means that the function module will be selected based at least partially on characteristics of the user device, such as installed applications and user activity. In a modification to what is shown in FIG. 4, device-responsiveness may be an option for developer-specified rank as well, with device-responsiveness narrowing down the function modules to choose, and the developer-specified rank being used to break any ties.

Function Message Exchange Formats

Figure 5:
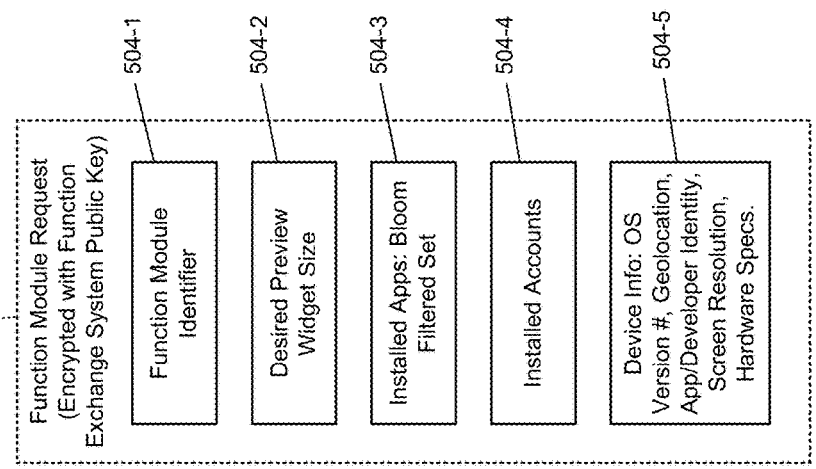
FIG. 5 depicts an example format of a function request sent to a function exchange system.

In FIG. 5, example contents of a function request 504 may be encrypted with a public key of the function exchange system 132 so that the contents cannot be intercepted by an eavesdropper. A function module identifier 504-1 identifies, using a pre-arranged code, which function module is desired by the transmitting app. When the function exchange system 132 is to perform some or all of the function module selection processes, the function module identifier 504-1 may actually identify multiple function modules.

A desired preview widget size field 504-2 may specify a width and height of the area reserved for the function module. A representation of installed apps 504-3 is provided. For example, an exhaustive listing of all installed apps, including titles and version numbers, may be included. In some implementations, a bit field may be specified for the one hundred most-popular apps. In other words, one hundred binary digits correspond to whether each of those apps is installed, with a zero indicating that the app is not installed and a one indicating that the app is installed. To allow for this shortened bit field format, the set of apps must be pre-arranged. Although one hundred is used as an example, for efficient storage a power of two (such as 128) may be used.

Another mechanism for indicating installed apps using a limited number of bits is a Bloom filter. The Bloom filter specifies whether an app from a predefined set of apps is possibly installed on the device or whether the app is definitely not installed. In other words, to achieve storage compression, the output of a Bloom filter does not definitively state that a certain app is present; the Bloom filter output only definitively states whether certain apps are not present.

An installed accounts data structure 504-4 may report which accounts are present on the user device, and any relevant details about those accounts that might be available. This may impact how relevant a result is. For example, if the user has expressed an interest in streaming a movie, but their account on a particular service does not allow streaming of that movie, the corresponding state may receive a reduced score. The installed accounts data structure 504-4 may additionally or alternatively report which accounts are active on the user device, and any other available data, such as how recently the account was last accessed.

Device info 504-5 may include the operating system and the operating system version number. The info 504-5 may also include geolocation data for the device, an identity of the app sending the function request 504, an identity of the app developer of the app, screen resolution, portrait/landscape orientation, and sensor capability (precision of accelerometer, presence of heart rate sensor, etc.).

The app or app developer identities may be used by the function exchange system 132 to apply pre-arranged parameters provided by the developer portal 400, such as the selection rules. The app identity may also be used by the function exchange system 132 to remove functions related to the app itself from the results—in other words, to avoid returning a function module that simply duplicates functionality of a portion of the requesting app. Further, the function exchange system 132 may store a mapping from app identity to desired function modules, so that the app identity alone indicates the function module of interest. In such a case, the function module identifier 504-1 may be omitted.

Figure 6A:
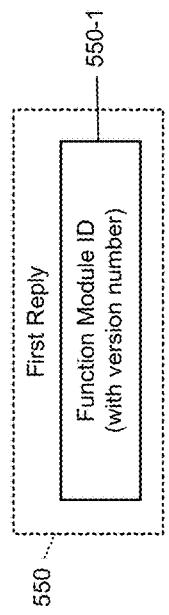
FIGS. 6A-6C depict example reply formats returned in response to a function request.

In FIG. 6A, a first reply 550 is shown, which the function exchange system 132 sends to the dynamic execution framework 316. The first reply 550 includes a function module ID 550-1 which specifies a unique ID of the function module selected by the function exchange system 132 to match the function requested by the dynamic execution framework 316.

The function module ID 550-1 may also include a version number. The version number allows the dynamic execution framework 316 to evaluate whether a newer version of the function module is available. If the dynamic execution framework 316 does not have a copy of the function module identified by the function module ID 550-1 or if the cached copy of the function module is out of date, the dynamic execution framework 316 requests the function module from the function exchange system 132. This request may simply include a copy of the function module ID 550-1.

Figure 6B:
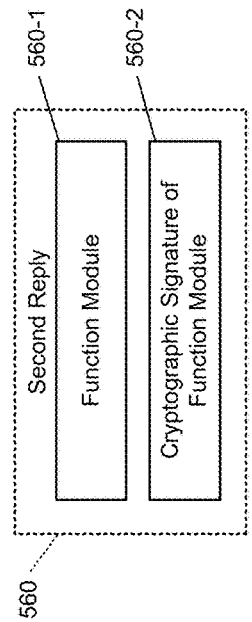

In response to the explicit request for a function module, a second reply 560, as shown in FIG. 6B, may be sent. The second reply 560 includes a copy of a function module 560-1 identified by the function module ID 550-1. A cryptographic signature 560-2 may prevent undetected tampering with the function module 560-1 by a man-in-the-middle attack.

Figure 6C:
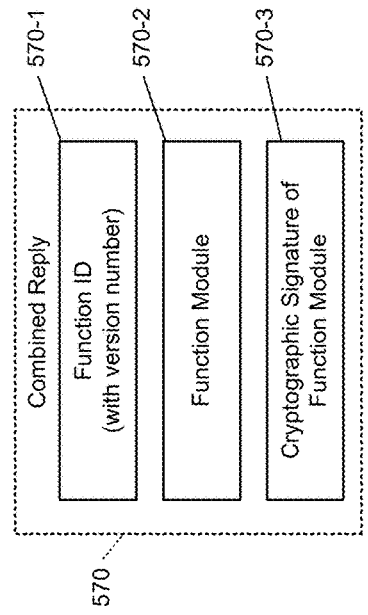

In various implementations, a combined reply 570 may be sent by the function exchange system 132 as shown in FIG. 6C. The combined reply 570 may be sent when the function exchange system 132 knows that the function module has not already been sent to the dynamic execution framework 316. In other implementations, the combined reply 570 may be sent simply so that download of the function module does not wait for another round of communication between the dynamic execution framework 316 and the function exchange system 132.

Function Exchange System

Figure 7:
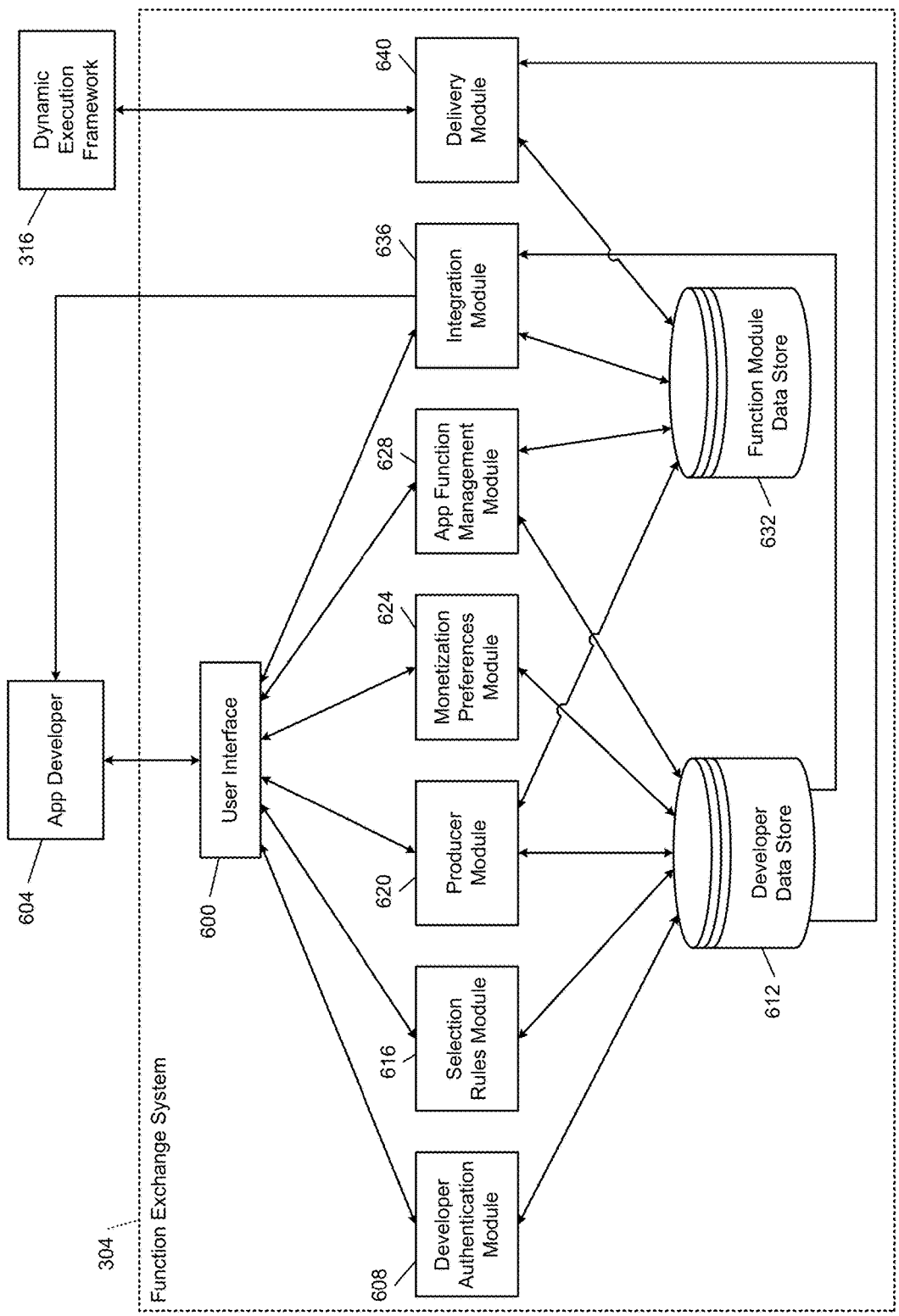
FIG. 7 is a high-level functional block diagram of an example function exchange system.

In FIG. 7, an example implementation of the function exchange system 132 is shown as a block diagram. A user interface 600 of the function exchange system 132 allows an app developer 604 (which may be operating in a producing role or in a consuming role) to interact with the function exchange system 132. The user interface 600, including the developer portal 400, may be implemented as a website available over the Internet.

A developer authentication module 608 stores credentials for developers and securely authenticates each developer to the function exchange system 132. The developer authentication module 608 may store credentials in a developer data store 612. Credentials may be stored according to best practices, such as by adding a cryptographic salt value to the credential and using a strong hashing function, such as PBKDF2 (Password-Based Key Derivation Function 2).

A selection rules module 616 records, in the developer data store 612, information from the developer regarding rules for how to select a function module for execution.

A producer module 620 allows a producing developer to provide function modules to the function module data store. The producing developer may provide metadata stored in each function record, including previews, dependencies, etc. The producing developer may track usage of their function modules and update the function modules.

A monetization preferences module 624 stores payment preferences that allow consuming and producing app developers to make payments to the function exchange system 132 and/or to each other, and to receive payments. In various implementations, a consuming app developer may receive compensation for directing traffic to a function module or an app of a producing developer. Further, a producing developer may pay the function exchange system 132 because use of the producing developers function modules may drive increased awareness or engagement with the producing developer.

In addition, advertisements may be shown inside of, or adjacent to, a user interface displayed by a function module. Revenue related to these advertisements may be shared with the function exchange system 132 and one or both of the producing and consuming developers. In other words, a producing developer may be willing to pay (according to, for example, cost per impression, cost per click, or cost per install) to have their app promoted to the consuming developer and/or to end users using an app of a consuming developer.

An app function management module 628 allows a consuming developer to identify and select one or more function modules based on a function ontology stored in a function module data store 632.

The function exchange system 132 will either provide function modules to the app developer for integration into the app under development or provide a selected function module to the app at runtime.

The app function management module 628 may also track the various apps that each developer is developing in concert with the function exchange system 132, including names and other parameters of each app.

An integration module 636 provides a dynamic execution framework to the app developer 604. This dynamic execution framework may provide a sandbox that allows a function module to be executed within an app developed by the app developer 604. The integration module 636 may tailor the dynamic execution framework to preferences stored in the developer data store 612 and may include one or more function modules from the function module data store 632.

The integration module 636 may create API (application programming interface) calls that permit the dynamic execution framework to be called by a software routine developed by the app developer 604. These API calls may specify details from the developer data store 612, such as selection rules, user interface sizing, and identification of desired function modules.

The integration module 636 provides the generated code to the app developer 604. The generated code may include source code, object code, libraries, header files, and resources (such as images and fonts). In implementations where the API calls encapsulate all settings specific to the app developer 604, the dynamic execution framework may be a static library that is the same across all developers. In this way, the API calls provided to the app developer 604 by the integration module 636 allow the dynamic execution framework to request function modules using the settings from the app developer 604 while remaining a standardized library.

A delivery module 640 services requests from the dynamic execution framework 316 during runtime of an app developed by the app developer 604. In response to the dynamic execution framework 316 specifying a single function module, such as using a numeric ID, the delivery module 640 simply provides a specified function module to the dynamic execution framework 316. When multiple function modules are specified by the dynamic execution framework 316, the delivery module 640 may narrow the choices down to a single function module. The delivery module 640 may access information from the developer data store 612, such as rules for selecting a single function module.

In other implementations, the identification of desired function modules is received directly from the dynamic execution framework 316. The delivery module 640, as explained in more detail below, identifies candidate function modules that match any eligibility requirements. For example, some function modules may require a certain operating system or even a certain operating system version. Other function modules may require certain apps to be installed.

The delivery module 640 then ranks the candidate function modules, such as based on a developer-specified order, popularity, revenue to one or more of the function exchange system 132, the consuming app developer, and the producing developer, and/or some other metric, such as how recently updated the function module is. The delivery module 640 then provides the highest-ranking function module to the dynamic execution framework 316.

Function Module Record Format

Figure 8:
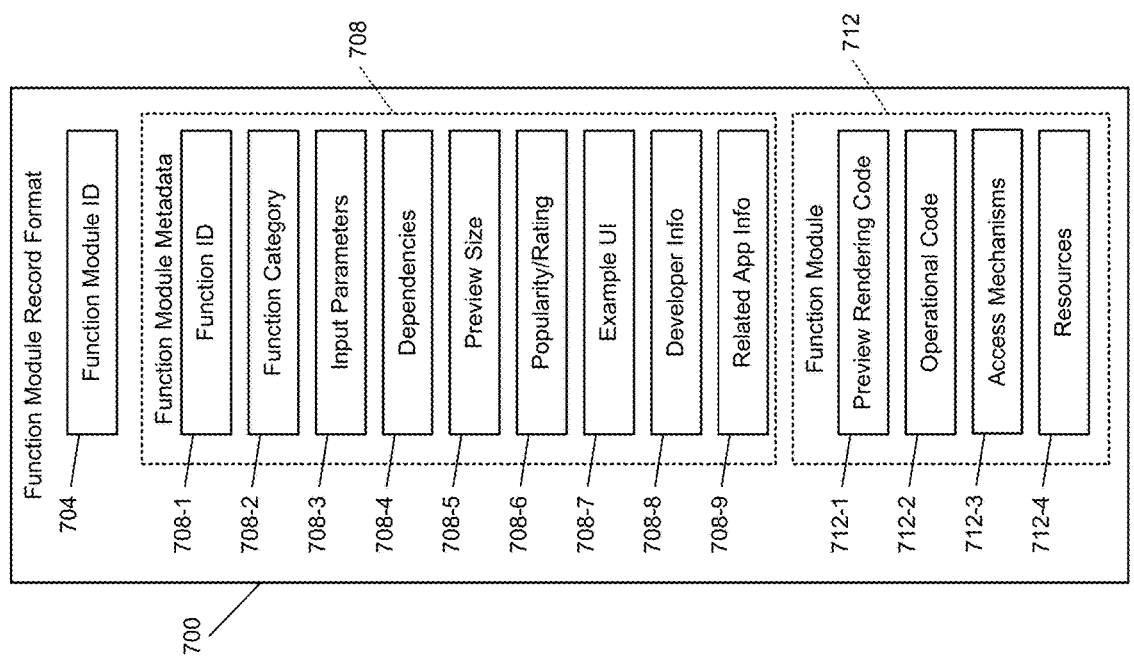
FIG. 8 is a graphical representation of an example function module record format.

In FIG. 8, an example format 700 for function module records stored in the function module data store 632 is shown. A function module ID 704 may uniquely identify the function module within the function module data store 632. Function module metadata 708 includes a function ID 708-1 that may identify the function uniquely within a function ontology. A function category field 708-2 may identify the branch node above the function within the function ontology.

An input parameters field 708-3 indicates the parameters and types of values that may be provided or required by the function module. For example, a function module that provides mapping services may require a destination location to be inputted and may optionally allow a present location to be inputted.

A dependencies field 708-4 indicates what requirements must be met by the user device in order to run the function module. For example only, the version of the dynamic execution framework embedded in the app may be specified, and the operating system and acceptable version numbers may be specified. The dependencies field 708-4 may also specify which app or apps must be installed on the user device and/or which accounts must be active on the user device.

A preview size field 708-5 indicates a size of either an entire deep view card for the function module or an image portion of the deep view card for the function module. For example, a deep view card may be created by positioning an image generated by the function module adjacent to text generated either by the function module or by the host app. The preview size may be specified in number of pixels and may include a height and a width.

A popularity/rating field 708-6 may specify an all-time popularity of the function module or app from which the function module was developed. In other implementations, popularity may be determined based on a limited timeframe, such as the past month or year. Popularity may also reflect a derivative value of the popularity (such as download velocity—that is, how fast downloads of an app are increasing).

The popularity may also be based on how often the function module is used by a host app. The popularity may also be based on how often the function module is selected by a consuming developer or by the function exchange system 132 for provision to a dynamic execution module. A rating may be based on user feedback of an app or a function module, and may be based on external data sources, such as reviews, blog posts, digital distribution platform ratings, etc.

An example user interface field 708-7 may present one or more screenshots of how a user might interact with the function module. These may be displayed in the developer portal to allow a consuming developer to determine how well the function module will match the consuming developer's goals.

A developer information field 708-8 includes information about the developer of the function module, such as the corporate name of the developer and any commonly-recognized names for the developer. In addition, logos and images associated with a developer may be included. A related app info field 708-9 includes information about any apps from which the function module was derived. For example, a related app may be known to some users, such as by title or icon, and this information may help a user to select a function module.

A function module 712 includes preview rendering code 712-1 for rendering a deep view card for use in a user interface of a consuming developer's app. The preview may include graphical information that indicates what the function module will provide if selected and may also include independently actionable data. This independently actionable data may allow the user to gain the necessary information from a function module without having to activate the function module or leave the present state of the consuming developer's app.

Operational code 712-2 may implement functionality once the function module is activated. For example, if a function module provides mapping capability, the preview rendering code 712-1 may provide a simple preview of a map near a specified location. By actuating the function module, the operational code 712-2 may provide an interactive map that may allow for panning, scrolling, zooming, etc.

Access mechanisms 712-3 may be used instead of the operational code 712-2, or may allow access to additional functionality beyond what is available using the operational code 712-2. When the function module is actuated, one or more of the access mechanisms 712-3 may be used to open another app to a desired state to provide the functionality.

Continuing with the mapping example, one of the access mechanisms 712-3 may open the mapping app stored on the user device from the same developer that developed the function module. This mapping app may therefore be specified as a dependency in the dependencies field 708-4. While the operational code 712-2 may allow for an interactive map that allows pan and zoom, one of the access mechanisms 712-3 may be used to reach a mapping app that can display additional information, such as satellite imagery or bike routes.

Resources 712-4 may include elements required for user interface creation, including images, fonts, style sheets, etc.

Developer Portal Flowchart

Figure 9:
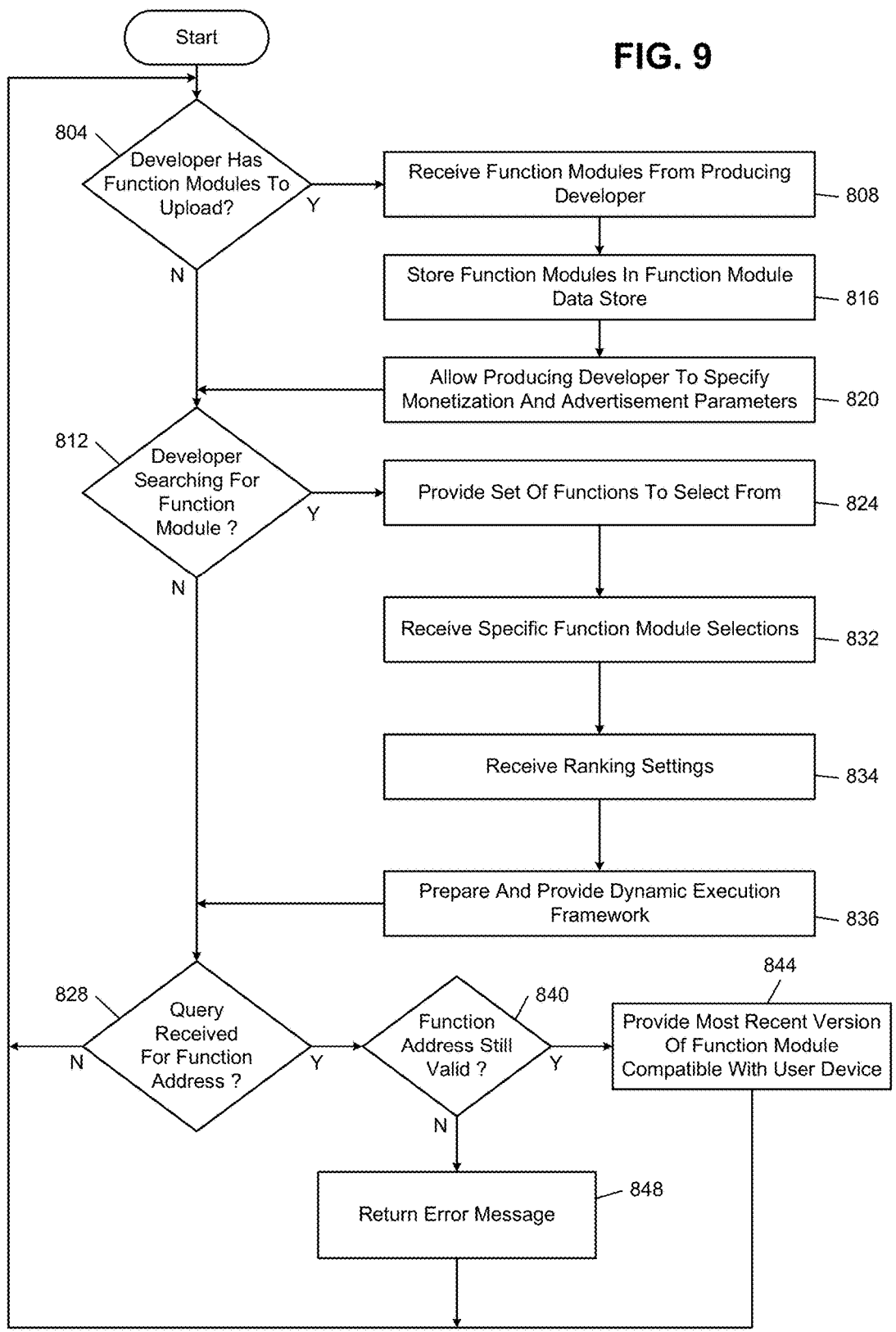
FIG. 9 is a flowchart of example operation of the function exchange system.

In FIG. 9, example operation of the function exchange system 132 begins at 804. If a developer authenticated to the function exchange system 132 has function modules to upload (in the developer's role as a producing developer), control transfers to 808; otherwise, control transfers to 812. At 808, control receives the function modules from the producing developer and continues at 816. At 816, control stores the received function modules in the function module data store and continues at 820. At 820, control allows the producing developer to specify monetization and advertisement parameters with respect to each function module. Control then continues at 812.

At 812, if a developer is searching for a function module (in a role as a consuming developer), control transfers to 824; otherwise, control transfers to 828. At 824, control allows a function modules to be reviewed. The function modules may correspond to a designated function, which may be selected from a list or a graphical representation such as a tree. The list or graphical representation may be filtered and/or keyword searched by the developer. At 832, control receives specific function module designations from the developer. At 834, control allows various settings to be prescribed by the developer, such as function module selection rules. Control continues at 836, where dynamic execution framework is provided to the consuming developer. Control continues at 828.

At 828, control determines whether a query has been received from a dynamic execution module. This query may take the form of a specific function module identifier which may be a location indicator or address of the function module. The query may specify multiple function addresses, leaving the selection of a single function module to the function exchange system 132. If a query has been received, control transfers to 840; otherwise, control returns to 804. At 840, control determines whether any of the function addresses are still valid. If so, control continues at 844; otherwise, control transfers to 848. At 848, control returns an error message and returns to 804. In response to the error message, the consuming developer's app may have a back-up solution, such as a text link to a website that may provide similar functionality.

At 844, control determines which function modules specified by the query are compatible with the user device. When only one function module is compatible, control provides the most recent version of that function module to the user device. When there are multiple possible function modules, control may rank the function modules based on, for example, popularity of the function module, popularity of a related app to the function module, and a numeric ranking from a developer. Additional ranking features are described above.

The most recent version of the highest-ranked function module is returned to the user device. In instances where more recent versions of the function module are not compatible with the device but older versions are, control may reduce the rank of function modules whose most recent version is not compatible with the user device. If a function module whose most recent version is not compatible with the user device is the only remaining viable function module, control will return the most recent version that is compatible with the user device. Control then returns to 804.

The ranking may include determining a metric for each function module based on a weighted sum or average of a variety of factors. The factors may include popularity, requested user interface (UI) widget size, etc. The ranking then identifies the function module having the highest metric. The consideration set of function modules may be sorted, such as by using a quicksort algorithm, so that the first or the last function module will have the highest metric.

Dynamic Execution Framework

In FIG. 10A, an example user interface 900 provides selection options to a user. For example, the user interface 900 may be accessed from within a search app by a settings user interface element (often indicated with a gear icon). A first user interface element 904 allows the user to specify that the developer can choose which function module to use for which function. A second user interface element 908 allows the user to selectively tailor the developer rankings to the user device.

For example, as described above, the developer-specified ranking may be modified based on which apps are installed on the user device, which accounts are active on the user device, and which apps are used most frequently. A hand 912 is shown about to select a third user interface element 916, which indicates the user's desire to choose the function module for each function. A selection frame 920 allows the user to perform selection but is disabled (shown in FIG. 10A as being grayed out) until the third user interface element 916 is selected.

In FIG. 10B, the third user interface element 916 has been selected and therefore the selection frame 920 is now enabled. In addition, the second user interface element 908 has been disabled as not being relevant. In other implementations, the second user interface element 908 may remain enabled so that tailoring the function module selection to the user's device can be enabled or disabled even when the user is choosing function modules explicitly.

In the selection frame 920, three functions are shown: "show maps," "reserve restaurant," and "read reviews." Multiple function modules are shown for each function, and identified (in FIG. 10B) by the app from which the function module was derived. A function module 940 corresponding to "app 2" is shown as being selected for the "show maps" function. The "reserve restaurant" function can also be served by app 2, although a hand 944 is shown to indicate that the function module corresponding to app 5 is about to be selected. Once app 5 is selected, the button may be visually emphasized, such as seen with the function module 940, to indicate a selection.

If a user selection is not made, function module selection may revert to the rank specified by the developer. In various implementations, at most one function module can be selected by the user. However, in some implementations, the user can select as many of the function modules as they like. Then the developer ranking, and device tailoring, may be used to narrow the selection to a single function module.

Figure 11:
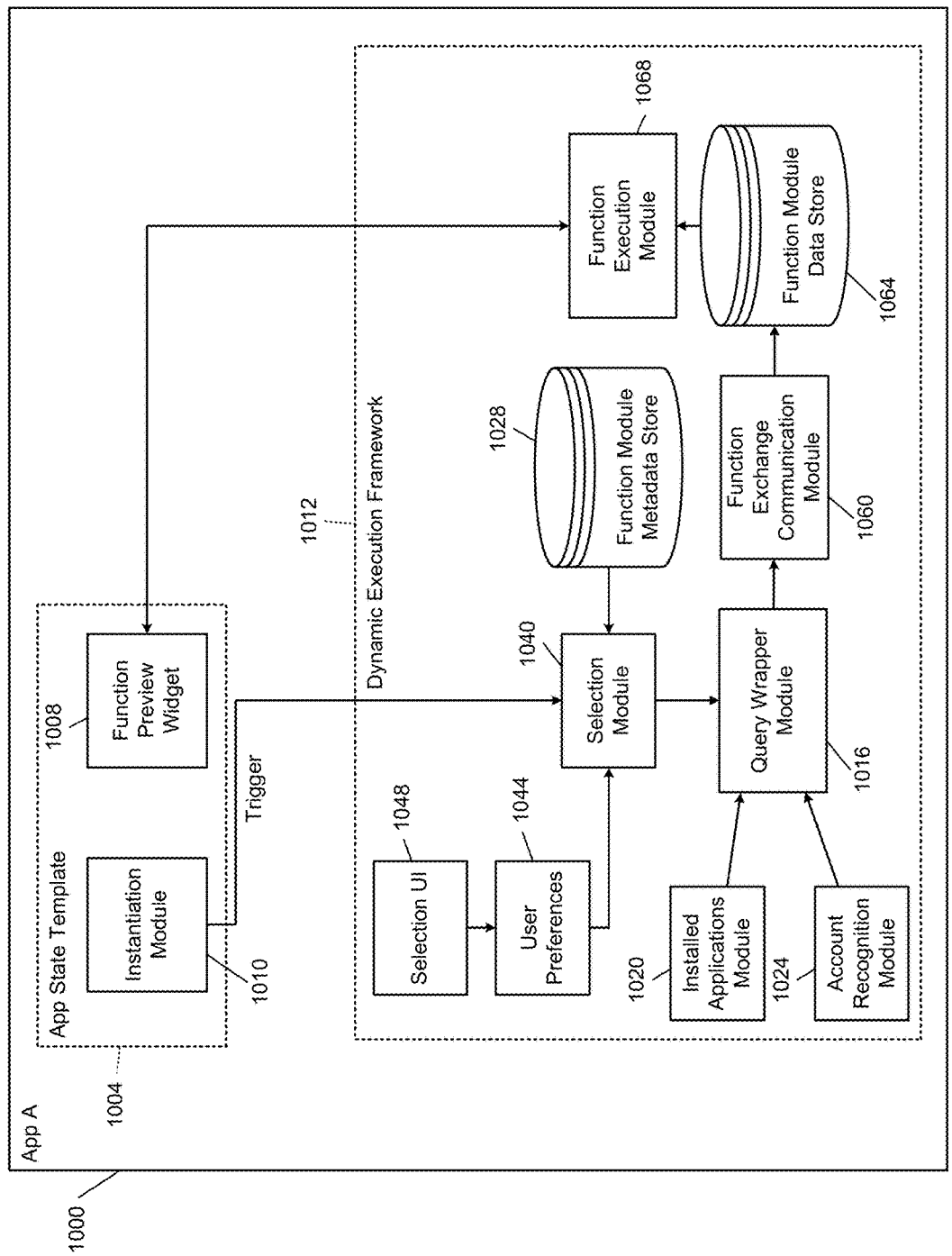
FIG. 11 is a partial block diagram of an example dynamic execution framework in an application developed according to the principles of the present disclosure.

In FIG. 11, an example of various functional blocks within an example application (App A 1000) are shown. App A 1000 may include a number of templates for app states. These templates define the contents of each state (sometimes referred to as a screen) of App A 1000. An app state template 1004 includes a function preview widget 1008 in which a preview generated by a function module will be shown.

The app state template 1004 includes an instantiation module 1010 that is invoked when an app state is instantiated based on the app state template 1004. The instantiation module 1010 sends a trigger signal to a dynamic execution framework 1012. The dynamic execution framework 1012 may have been provided by the function exchange system 132 to the developer of App A 1000 and integrated into App A 1000 during development.

The dynamic execution framework 1012 includes a query wrapper module 1016 that formulates a query (or, request) to be sent to the function exchange system 132. The query may be based on an installed applications module 1020 that identifies applications installed on the user device and provides a representation of the installed applications to the query wrapper module 1016.

An account recognition module 1024 identifies active user accounts on the user device. For example, an account with a streaming video operator may indicate that some or all movies from that provider can be streamed as part of the existing subscription service. This may allow function modules corresponding to that streaming video operator to be provided by the function exchange system 132.

A function module metadata store 1028 stores which function modules were selected by the app developer for each app state template. The function preview widget 1008 corresponds to a function, and the designated function module metadata store 1028 records which function modules perform that function. In other implementations, the dynamic execution framework 1012 may be a preset piece of software, such as a library. In this case, the data provided by the designated function module metadata store 1028 may be replaced by parameters in an API call. The app state template 1004 may then store these API calls, and a trigger message to the query wrapper module 1016 can specify the desired function modules in an API call.

The trigger message and/or the designated function module metadata store 1028 may also store additional settings (which may alternatively be stored by the function exchange system 132), such as function module selection rules. The query wrapper module 1016 formulates a query such as that shown in FIG. 5.

A selection module 1040 provides the query wrapper module 1016 with one or more function module identifiers based on the function modules corresponding to the function preview widget 1008. In various implementations, the selection module 1040 may select a single function module for inclusion in the query wrapper. In other implementations, the selection module 1040 may provide one or more function module identifiers, relying on the function exchange system 132 to narrow the choice down to a single function module.

The selection module 1040 may operate based on ranking criteria stored in the function module metadata store 1028, such as developer-specified rankings and popularity indicators for function modules. The selection module 1040 may also access user preferences 1044, which may be updated using a selection user interface (UI) 1048. The selection UI 1048 may be implemented as part of another app state template of App A 1000. For example, this app state template may simply include a full-screen placeholder for the interface provided by the selection UI 1048. For example only, the interface may appear similar to that of FIG. 10A and FIG. 10B.

A function exchange communication module 1060 communicates with the function exchange system 132. The function exchange communication module 1060 provides the formulated query to the function exchange system 132, and receives in response a function module and/or an identifier of a specified function module. The function exchange communication module 1060 may communicate with the function exchange system 132 using a wireless transceiver of the user device on which App A 1000 is executing.

Based on the identity of the function module, the function exchange communication module 1060 may then request the full function module to be provided. In other implementations, as described above, the function module may be sent immediately regardless of whether the function module has already been received by the dynamic execution framework 1012. The function exchange communication module 1060 stores received function modules in a function module data store 1064.

The function module data store 1064 may be implemented as a relational database, such as a lightweight implementation of the MySQL open source database. The database may have a record for each function module retrieved via the function exchange communication module 1060. Each record may have fields such as module name, version number, retrieval date, date of last check for updates, whether Internet access is required, etc. Each record may also include a pointer to a file including the function module code. In various implementations, the database schema for the function module data store 1064 may be a subset of a schema used by the function module data store 632 of the function exchange system 132.

A function execution module 1068 executes the function module corresponding to the function preview widget 1008 within the context of App A 1000. In other implementations, the function module may be executed within a sandbox within App A 1000 or within a sandbox separate from App A 1000. The sandbox may be provided by an operating system of the user device or by the dynamic execution framework 1012 itself.

Execution of the function module provides information, such as text and graphics, which are displayed within the function preview widget 1008. When the user actuates (such as by touching or clicking) the function preview widget 1008, the executing function module recognizes that additional operation is requested. The executing function module may create a new state or may provide additional user interface elements to the state corresponding to the app state template 1004.

In other implementations, the executing function module may use an access mechanism to open, or to install and open, an app that provides additional functionality. Upon exiting from the state or the user interface element created by the function module, the state corresponding to the app state template 1004 may once again be in the foreground of App A 1000.

In various implementations, the function module data store 1064 may simply be a temporary buffer, located in volatile memory (such as Random Access Memory), that stores the function module as the function module is being downloaded. The function module is then unpacked and/or decompressed into the function execution module 1068.

In some implementations, the function module may remain stored in volatile memory without being cached into nonvolatile memory for later execution. Note that the operating system may temporarily page volatile memory including part or all of the function module to nonvolatile memory according to routine memory management. However, this may be transparent to the dynamic execution framework 1012.

When caching function modules, the function module data store 1064 may store the function modules in nonvolatile memory to persist across reboots of the user device. When not caching function modules, the function module data store 1064 may not even be implemented, with the function module instead being loaded into the function execution module 1068 directly from the function exchange communication module 1060.

Figure 12:
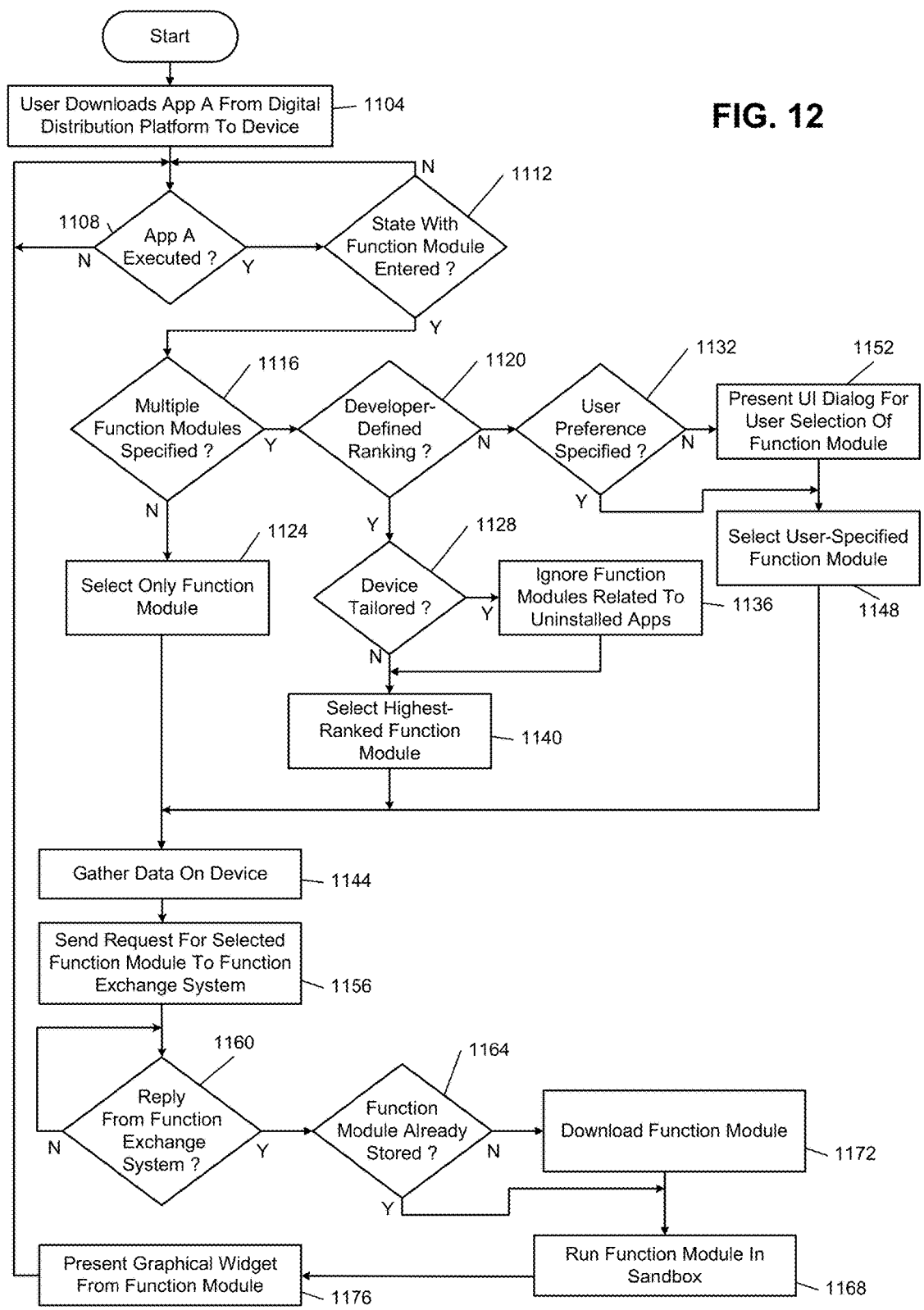
FIG. 12 is a flowchart of example operation of dynamic execution framework within an application.

In FIG. 12, example operation of an app including a dynamic execution framework begins at 1104. At 1104, a user downloads an app (referred to as App A) from a digital distribution platform to the user's device. At 1108, if App A is executed, control continues at 1112; otherwise, control remains at 1108. At 1112, control determines whether a state with a function module is entered within App A. If so, control transfers to 1116; otherwise, control returns to 1108.

At 1116, if multiple function modules have been specified, control transfers to 1120; otherwise, control transfers to 1124. At 1120, control determines whether the developer-defined ranking will control. If so, control transfers to 1128; otherwise, control transfers to 1132.

At 1128, control determines whether a setting has been made that the function module selection should be tailored to the device. If so, control transfers to 1136; otherwise, control transfers to 1140. At 1136, control rules out function modules related to uninstalled apps. This is one example of tailoring the function module selection to the user device. If, however, there are no relevant function modules related to installed apps, none of the function modules will be ignored. Control continues at 1140. At 1140, control selects the highest-ranked function module. Control then continues at 1144.

At 1132, the developer-defined ranking will not be used and therefore user preference is consulted. If the user preference has already been specified, control transfers to 1148; otherwise, control transfers to 1152. At 1152, control presents the user interface dialog allowing the user to select a function module corresponding to the function in the current state. When multiple functions are present in the current state, multiple user interface dialogs may be presented. When multiple instances of the same function are presented, the user interface dialog may be presented only for one of them, while the other function locations simply show a placeholder until the selection is made. Control then continues at 1148.

At 1148, control selects the user-specified function module and continues at 1144. At 1144, control gathers data on the user device, such as installed applications and active accounts. At 1156, control sends a request, including a predetermined function identifier and gathered data, to the function exchange system. At 1160, control waits for a reply from the function exchange system. Once a reply is received, control transfers to 1164; otherwise, control remains at 1160. At 1164, control determines whether the function module specified by the reply is already stored in a local data store. If so, control transfers to 1168; otherwise, control transfers to 1172.

Alternatively, control may perform the check at 1164 prior to 1144 (not shown). If the function module is already stored, and there is a reasonable likelihood that the stored function module is not out of date, control may skip 1144, 1156, 1160, and 1172, proceeding directly to 1168. For example, the function module may be marked with an expiration date indicating how long it will be valid before needing to be re-downloaded or at least checked.

In other implementations, if the function module has recently been downloaded (or had its version checked), then the dynamic execution framework may assume that the function module has not been superseded. For example, the dynamic execution module may not transmit a second request for a function module within a predetermined period of time, such as 24 hours, of a prior request for the same function module.

At 1172, control downloads the function module specified in the reply, such as by sending a request to the function exchange system. Control then continues at 1168. At 1168, control runs the function module in the sandbox. At 1176, control presents a graphical widget from the function module to the user within the state. Control then returns to 1108.

Figure 13:
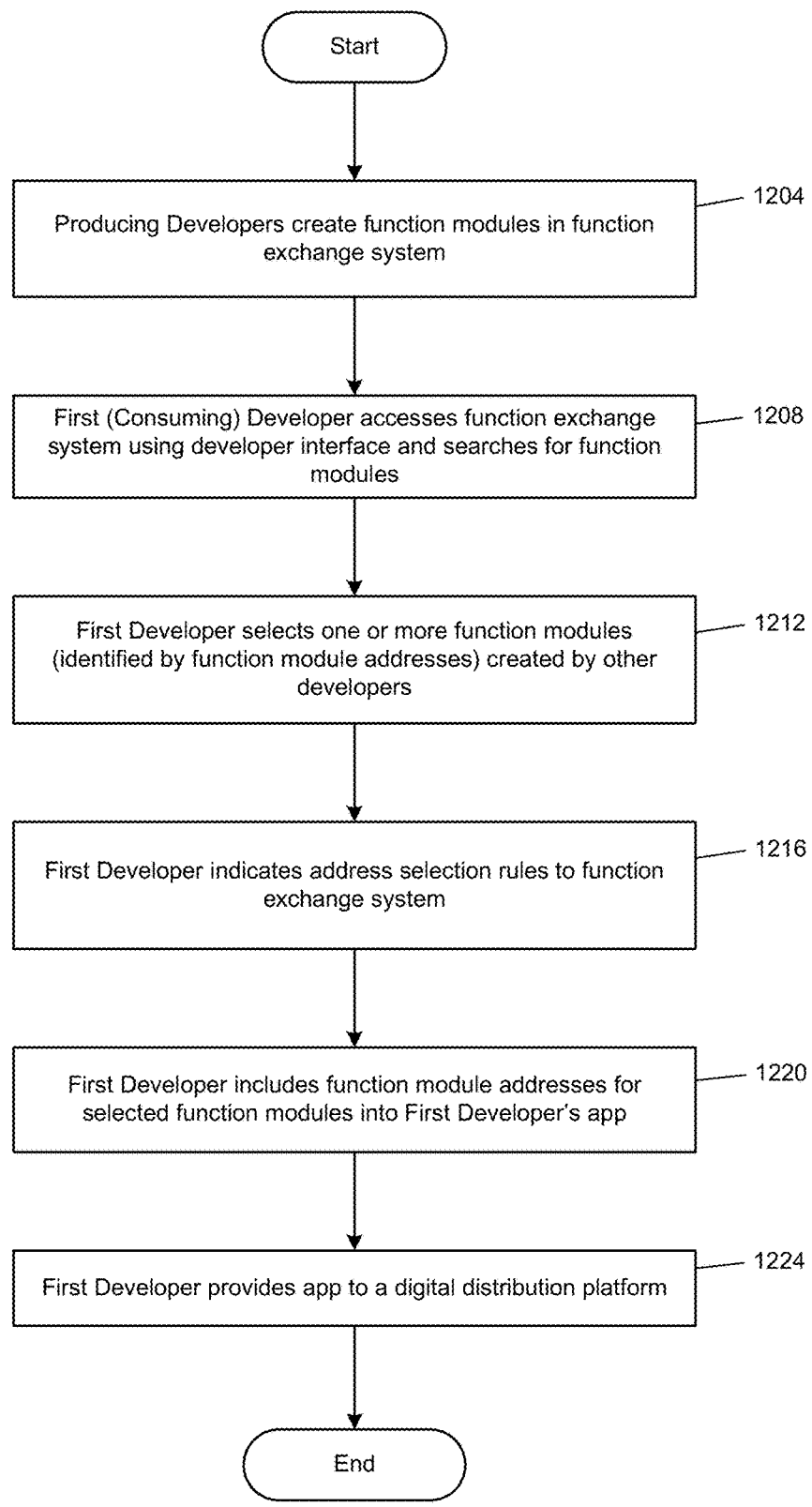
FIG. 13 is a flowchart of example interaction between developers and a function exchange system.

In FIG. 13, a method for a consuming developer to select and insert function modules into the consuming developer's app is presented. Control begins at 1204, where producing developers create function modules and submit them to the function exchange system. For example, the function modules may correspond to apps already created or in development from the producing developers.

At 1208, a first developer (consuming developer) accesses the function exchange system using a developer interface and searches for function modules. At 1212, the first developer selects one or more function modules created by producing developers. The function modules may be identified by function module addresses (also referred to as function addresses).

At 1216, the first developer indicates address selection rules to the function exchange system. At 1220, the first developer includes function module addresses for the selected function modules into the first developer's app. At 1224, the first developer completes development of the app and submits the app to a digital distribution platform. Control then ends.

Figure 14:
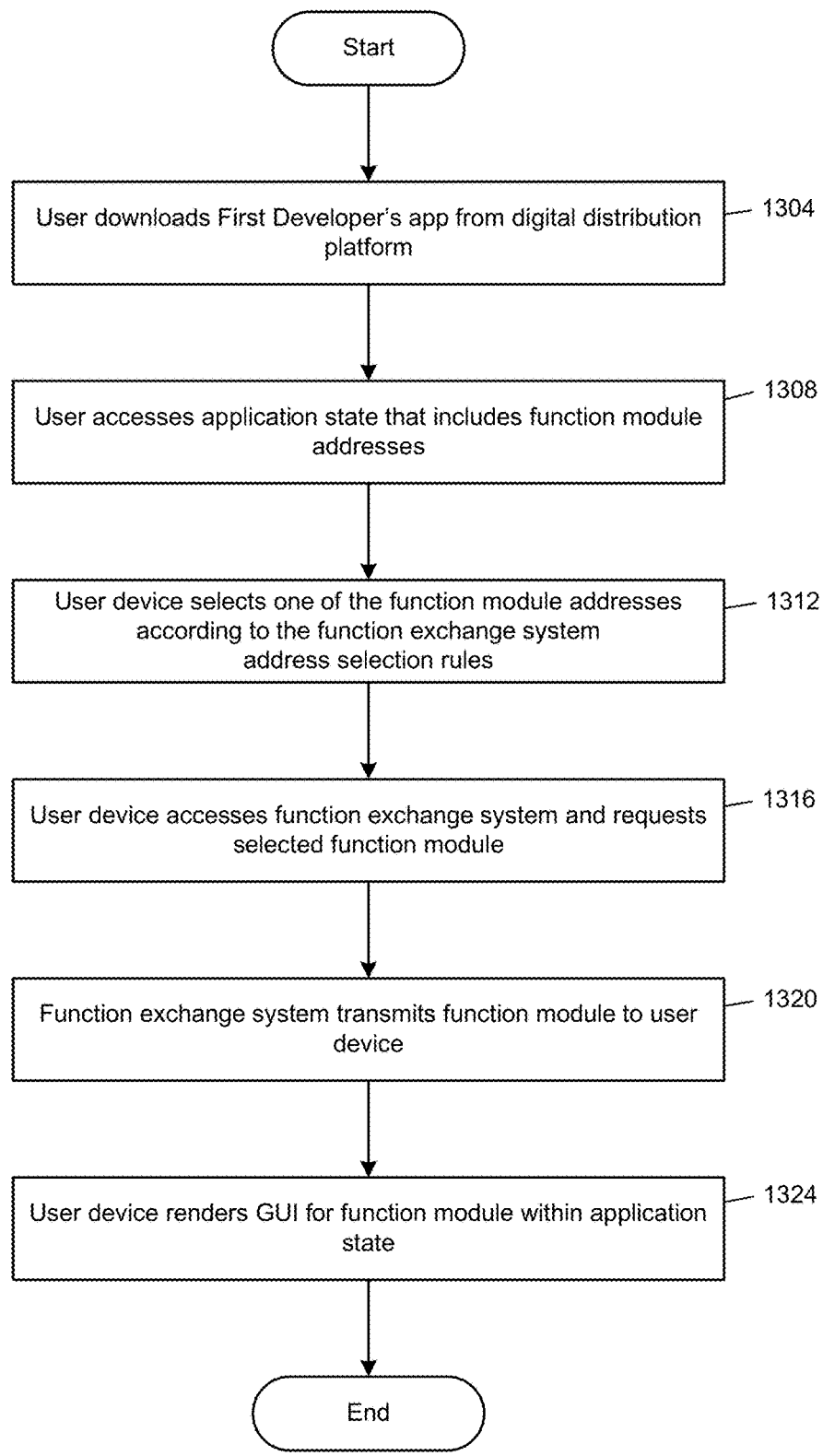
FIG. 14 is a flowchart of example interaction between a user device and a function exchange system.

In FIG. 14, a method is illustrated at the user device for selecting which function module to use. Control begins at 1304, where the user downloads the first developer's app from the digital distribution platform. At 1308, the user accesses an application state that includes one or more function module addresses.

At 1312, the user device selects one of the function module addresses according to the address selection rules that were submitted to the function exchange system. At 1316, the user device accesses the function exchange system and requests the selected function module. At 1320, the function exchange system transmits the requested function module to the user device. At 1324, the user device renders a graphical user interface for the function module within the application state. Control then ends.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group)

that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

What is claimed is:

1. A function exchange system comprising:
a network communication device;
a non-transitory computer-readable medium that stores:
  processor-executable instructions; and
  a plurality of function module records, wherein each of the function module records includes (i) a function module identifier, (ii) a function module, and (iii) an indication of a function performed by the function module; and
processor hardware that executes the processor-executable instructions,
wherein the processor-executable instructions include:
  for each of the function module records, receiving, via the network communication device, the function module from a corresponding one of a plurality of producing developers;
  generating an interface to receive a selection of one of the function module records by a consuming developer for incorporation into a state template of a first application under development by the consuming developer;
  in response to receiving the selection of the one of the function module records, providing the function module identifier of the selected one of the function module records to the consuming developer prior to the consuming developer distributing the first application via a digital distribution platform;
  receiving, via the network communication device, a function module request from a copy of the first application downloaded onto a user device via the digital distribution platform, wherein the function module request includes a first function module identifier that uniquely identifies a first function module record of the function module records;
  in response to receiving the function module request, transmitting, via the network communication device, the function module of the first function module record to the user device;
  maintaining a hierarchy of functions that each have a textual description, wherein:
    for each of the function module records, the indication of the function performed by the function module corresponds to one of the functions of the hierarchy; and
    the hierarchy is used in the interface to organize the function module records for selection by the consuming developer; and
  transmitting to the consuming developer, via the network communication device, a library for inclusion in the first application, wherein the library includes instructions to:

store the function module;
execute the function module; and
present display data generated by execution of the function module, wherein the display data is presented in an area reserved for the function by the state template.

2. The function exchange system of claim 1 wherein the processor-executable instructions include, in response to the function module request including a plurality of function module identifiers, selecting one of the plurality of function module identifiers as the first function module identifier.

3. The function exchange system of claim 2 wherein the processor-executable instructions include receiving a specification of developer-specified rules from the consuming developer, wherein the selecting one of the plurality of function module identifiers is performed according to the developer-specified rules.

4. The function exchange system of claim 2 wherein the processor-executable instructions include receiving a rank ordering from the consuming developer, wherein the selecting one of the plurality of function module identifiers is performed according to the rank ordering.

5. The function exchange system of claim 2 wherein the processor-executable instructions include:
generating an interface to receive a selection of a plurality of the function module records by the consuming developer; and
in response to receiving the selection of the plurality of the function module records, providing the function module identifiers of the plurality of the function module records to the consuming developer prior to the consuming developer distributing the first application via the digital distribution platform.

6. The function exchange system of claim 1 wherein the function module request includes data that indicates an installation status of applications on the user device.

7. The function exchange system of claim 6 wherein the data indicates the installation status of applications on the user device that are relevant to the function performed by the function module of the first function module record.

8. The function exchange system of claim 1 wherein the processor-executable instructions include:
receiving a new version of an existing function module of one of the function module records from a corresponding one of the plurality of producing developers and storing the new version of the existing function module in the non-transitory computer-readable medium; and
in response to receiving the new version of the existing function module, transmitting, via the network communication device, a notification to user devices that have downloaded the existing function module.

9. A computer-implemented method of operating a function exchange system, the method comprising:
storing, in a storage device of the function exchange system, a plurality of function module records, wherein each of the function module records includes (i) a function module identifier, (ii) a function module, and (iii) an indication of a function performed by the function module;
for each of the function module records, receiving, via a network communication device, the function module from a corresponding one of a plurality of producing developers;
generating an interface to receive a selection of one of the function module records by a consuming developer for incorporation into a state template of a first application under development by the consuming developer;
in response to receiving the selection of the one of the function module records, providing the function module identifier of the selected one of the function module records to the consuming developer prior to the consuming developer distributing the first application via a digital distribution platform;
receiving, via the network communication device, a function module request from a copy of the first application downloaded onto a user device via the digital distribution platform, wherein the function module request includes a first function module identifier that uniquely identifies a first function module record of the function module records;
in response to receiving the function module request, transmitting, via the network communication device, the function module of the first function module record to the user device;
maintaining a hierarchy of functions that each have a textual description, wherein, for each of the function module records, the indication of the function performed by the function module corresponds to one of the functions of the hierarchy;
organizing the function module records in the interface using the hierarchy for selection by the consuming developer; and
transmitting to the consuming developer, via the network communication device, a library for inclusion in the first application, wherein the library includes instructions for:
storing the function module;
executing the function module; and
presenting display data generated by execution of the function module, wherein the display data is presented in an area reserved for the function by the state template.

10. The method of claim 9 further comprising, in response to the function module request including a plurality of function module identifiers, selecting one of the plurality of function module identifiers as the first function module identifier.

11. The method of claim 10 further comprising receiving a specification of developer-specified rules from the consuming developer, wherein the selecting one of the plurality of function module identifiers is performed according to the developer-specified rules.

12. The method of claim 10 further comprising receiving a rank ordering from the consuming developer, wherein the selecting one of the plurality of function module identifiers is performed according to the rank ordering.

13. The method of claim 10 further comprising:
generating an interface to receive a selection of a plurality of the function module records by the consuming developer; and
in response to receiving the selection of the plurality of the function module records, providing the function module identifiers of the plurality of the function module records to the consuming developer prior to the consuming developer distributing the first application via the digital distribution platform.

14. The method of claim 9 wherein the function module request includes data that indicates an installation status of applications on the user device.

15. The method of claim 14 wherein the data indicates the installation status of applications on the user device that are relevant to the function performed by the function module of the first function module record.

16. The method of claim 9 further comprising:
receiving a new version of an existing function module of one of the function module records from a corresponding one of the plurality of producing developers and storing the new version of the existing function module in the storage device of the function exchange system; and in response to receiving the new version of the existing function module, transmitting, via the network communication device, a notification to user devices that have downloaded the existing function module.

\* \* \* \* \*